United States Patent
Motomura et al.

(10) Patent No.: US 7,340,098 B2
(45) Date of Patent: Mar. 4, 2008

(54) METHOD AND APPARATUS FOR IMAGE CONVERSION

(75) Inventors: Hideto Motomura, Nara (JP); Katsuhiro Kanamori, Nara (JP); Hiroyoshi Komobuchi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/541,508

(22) Filed: Sep. 29, 2006

(65) Prior Publication Data

US 2007/0217682 A1   Sep. 20, 2007

Related U.S. Application Data

(63) Continuation of application No. PCT/JP2006/305095, filed on Mar. 15, 2006.

(51) Int. Cl.
*G06K 9/46* (2006.01)

(52) U.S. Cl. .................. 382/190; 382/298

(58) Field of Classification Search ............. 382/190, 382/195, 197, 276, 282, 295, 298, 299; 348/561, 348/581, 704; 358/451
See application file for complete search history.

(56) References Cited

U.S. PATENT DOCUMENTS

| | | | |
|---|---|---|---|
| 4,800,539 A * | 1/1989 | Corn et al. | 367/72 |
| 5,263,097 A * | 11/1993 | Katz et al. | 382/190 |
| 5,717,789 A | 2/1998 | Anderson et al. | |
| 6,728,406 B1 | 4/2004 | Murao et al. | |
| 2003/0107568 A1 | 6/2003 | Urisaka et al. | |

FOREIGN PATENT DOCUMENTS

| | | |
|---|---|---|
| JP | 06-342468 A | 12/1994 |
| JP | 07-334664 A | 12/1995 |
| JP | 2001-092973 A | 4/2001 |
| JP | 2003-22442 A | 1/2003 |
| JP | 2003-115055 A | 4/2003 |
| JP | 2003-168129 A | 6/2003 |
| JP | 2003-216973 A | 7/2003 |
| JP | 2004-054947 A | 2/2004 |
| JP | 2004-110519 A | 4/2004 |
| JP | 2004-171121 A | 6/2004 |

(Continued)

OTHER PUBLICATIONS

Computer english translation of JP-2003-216973, pp. 1-32.*

(Continued)

*Primary Examiner*—Daniel Mariam
(74) *Attorney, Agent, or Firm*—Harness, Dickey & Pierce, P.L.C.

(57) ABSTRACT

An image feature analyzing section performs an image feature analysis with respect to an input image to output an image feature vector. A parameter output section stores a plurality of image feature vectors and a plurality of parameters corresponding to the respective image feature vectors and outputs an original parameter value corresponding to an image feature vector. A parameter operation setting section determines contents of an operation of an illumination equation parameter, depending on a prescribed image conversion. A parameter operating section operates the original parameter value in accordance with a prescription of the parameter operation setting section, to obtain a new parameter value. An image generating section generates an output image based on the new parameter value.

8 Claims, 24 Drawing Sheets

FOREIGN PATENT DOCUMENTS

WO      WO-01/71668 A2     9/2001

OTHER PUBLICATIONS

Computer english translation of JP-2001-092973, pp. 1-21.*
Computer english translation of JP-2004-110519, pp. 1-28.*
Shinji Araya, "Clear Commentary on 3D Computer Graphics", Kyoritsu Shuppan, Sep. 25, 2003, pp. 144-145 with partial English Translation.
Makoto Nakashizuka, et al., "Image Resolution Enhancement on Multiscale Luminance Gradient Planes", The Journal of The Institute of Electronics, Information and Communication Engineers, D-11, vol. J81-DII, No. 10, pp. 2249-2258, Oct. 1998 with partial English Translation.
Freeman, et al., "Learning Low-Level Vision", International Journal of Computer Vision, 40(1), pp. 25-47, 2000 (in English).
Hertzmann, et al., "Image Analogies", SIGGRAPH 2001, Proceedings, pp. 327-340, 2001 (in English).
Malik, et al., Prepresenting and Recognizing the Visual Appearance of Materials Using Three-Dimensional Textons, International Journal of Computer Vision, 43(1), pp. 29-44, 2001 (in English).

* cited by examiner

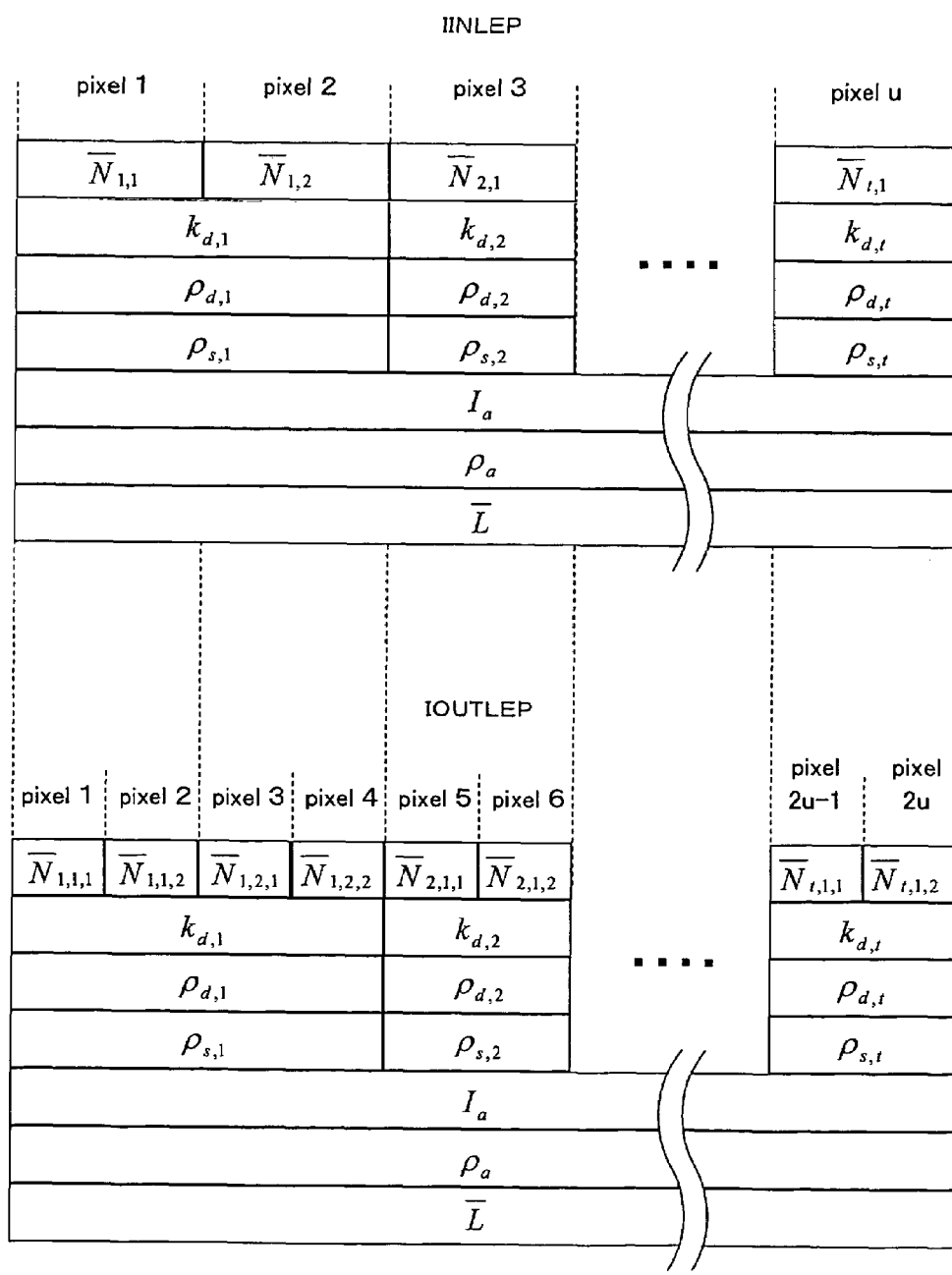

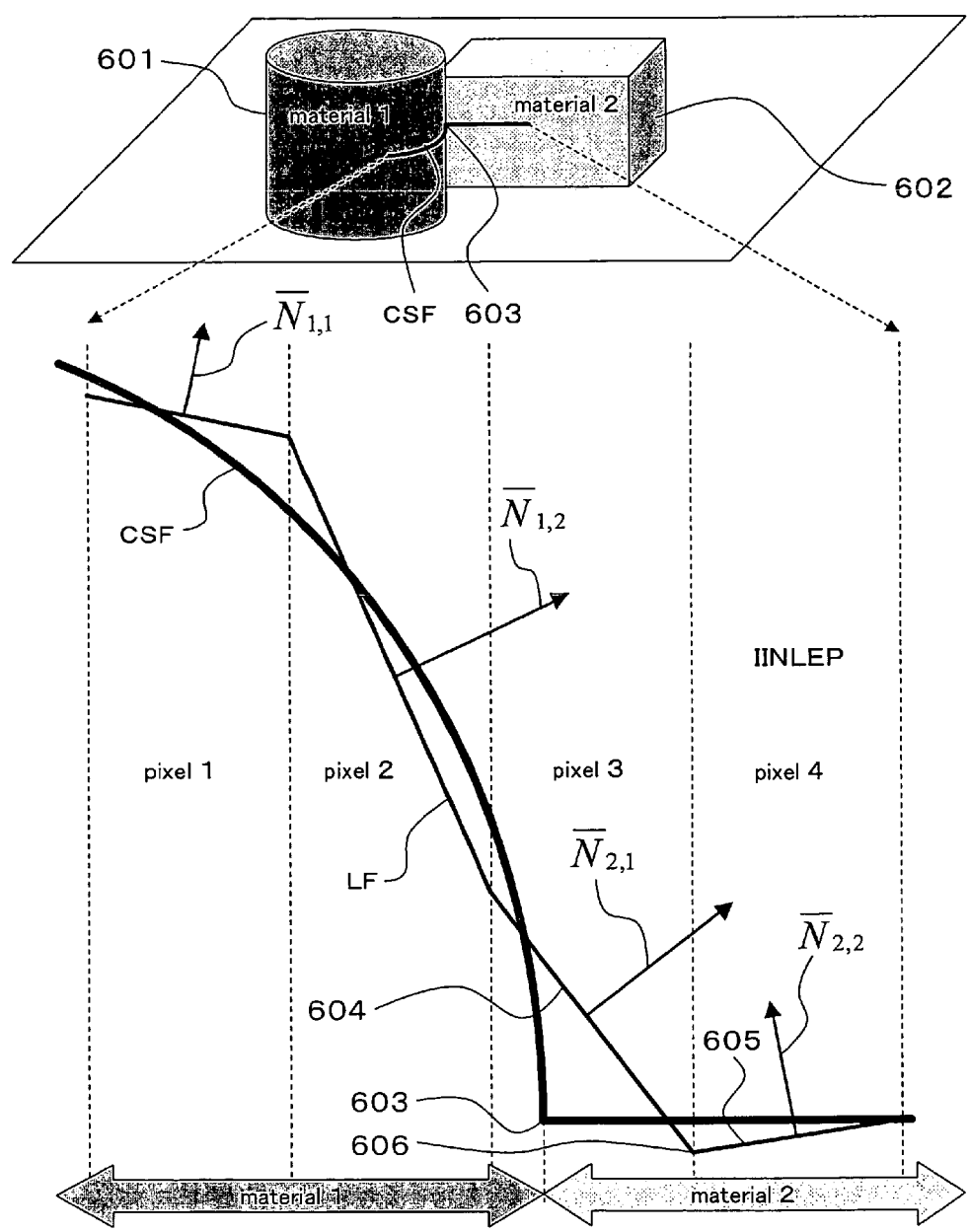

occurrence of error which increases luminance of pixel 3,
due to incorporation of material 1 decreasing of intensity of specular reflection component
by moving normal vector occurrence of error which increases luminance of pixel 3,
due to incorporation of material 1

Increasing of angle with respect to light source vector
by moving normal vector

METHOD AND APPARATUS FOR IMAGE CONVERSION

CROSS REFERENCE TO RELATED APPLICATIONS

This is a continuation of Application PCT/JP2006/305095 filed on Mar. 15, 2006.

BACKGROUND OF THE INVENTION

1. Field of the Invention

The present invention relates to an image processing technique, and more particularly, to a technique for achieving image conversion, such as image enlargement, illumination conversion, viewpoint conversion, and the like.

2. Description of the Related Art

With the advent of digital image apparatuses and digital networks, different kinds of image apparatuses can be easily connected to each other, and the degree of freedom of image exchange is increased. For example, an image captured by a digital still camera is output to a printer, is published on a network, or is viewed on a home television. In other words, an environment has been developed under which a user can freely handle an image without a limitation due to a difference between systems.

On the other hand, in order to achieve such an environment, each system needs to support various image formats, and perform a high level of image format conversion. For example, an up-converter (conversion apparatus for increasing the number of pixels and the number of lines) and a down-converter (conversion apparatus for decreasing the number of pixels and the number of lines) are required to perform image size conversion which frequently occurs. For example, when printing is performed with a resolution of 600 dpi on A4 paper (297 mm×210 mm), data of 7128 pixels×5040 lines is required. However, since most digital still cameras have a resolution lower than this resolution, an up-converter is required. Also, an image published on a network needs to be converted into an image size corresponding to an output device every time the output device is determined. Regarding home televisions, since digital terrestrial broadcasting services have been started, conventional standard televisions and High Definition (HD) televisions coexist, so that image-size conversion is frequently performed.

In order to enlarge an image, image data which does not exist when the image is captured needs to be newly created. To this end, various techniques have been proposed. For example, techniques employing interpolation, such as the bi-linear technique, the bi-cubic method, and the like, are generally used (Non-patent Document 1). However, when interpolation is used, only intermediate values of sampling data can be generated, so that the sharpness of an edge or the like is deteriorated, likely resulting in a blurred image. Therefore, a technique has been disclosed in which an interpolated image is used as an initially enlarged image, and thereafter, an edge portion is extracted and only the edge portion is emphasized (Patent Document 1, Non-patent Document 2). However, it is difficult to separate an edge portion from noise, so that noise is likely to be emphasized along with an edge portion, resulting in a deterioration in image quality.

Therefore, there is a learning technique of performing image enlargement while suppressing a deterioration in image quality. Specifically, a high-resolution image corresponding to an enlarged image is previously captured using a high-definition camera or the like, and a low-resolution image is created from the high-resolution image. The creation of a low-resolution image is typically performed using a method of performing sub-sampling using a low-pass filter. A large number of such sets of a low-resolution image and a high-resolution image are prepared, and a relationship therebetween is learnt as an image enlargement technique. Therefore, in the learning technique, the above-described emphasis technique does not exist, and therefore, it is possible to achieve image enlargement with a relatively less deterioration in image quality.

As an example of the learning technique, a technique of statistically performing learning based on the assumption that a relationship in luminance value between adjacent pixels is determined as a Markov process, has been disclosed (Non-patent Document 3). Also, a technique of calculating a feature vector for each pixel in a conversion pair from a low resolution to a high resolution, and generating an enlarged image based on the degree of matching with a feature vector of an input pixel and the consistency with a peripheral, has been disclosed (Non-patent Document 4).

The learning technique is also utilized for conversion of an illumination direction, and the like, as well as image enlargement (Non-patent Document 5). Non-patent Document 5 discloses a technique of illuminating a plurality of objects having different textures (unevenness, a pattern, or the like on an object surface) from a plurality of directions to create learning data, and converting an illumination direction while keeping the sense of texture.

Patent Document 1: U.S. Pat. No. 5,717,789 (FIG. 5)

Non-patent Document 1: Shinji Araya, "Clear Commentary on 3D Computer Graphics", Kyoritsu Shuppan, Sep. 25, 2003, pp. 144-145

Non-patent Document 2: Makoto Nakashizuka, et al., "Image Resolution Enhancement on Multiscale luminance Gradient Planes", The Journal of The Institute of Electronics, Information and Communication Engineers, D-II, Vol. J81-D-II, No. 10, pp. 2249-2258, October 1998

Non-patent Document 3: Freeman, et al., "Learning Low-Level Vision", International Journal of Computer Vision, 40(1), pp. 25-47, 2000

Non-patent Document 4: Hertzmann, et al., "Image Analogies", SIGGRAPH 2001, Proceedings, pp. 327-340, 2001

Non-patent Document 5: Malik, et al., "Representing and Recognizing the Visual Appearance of Materials using Three-dimensional Textons", International Journal of Computer Vision, 43(1), pp. 29-44, 2001

However, in conventional techniques, there are the following problems.

In the above-described learning techniques, since an enlarged image is selected from images used for learning, an enlargement method depends on learning data. A similar problem arises not only in image enlargement, but also in other image conversions, such as conversion of an illumination direction and the like.

Also, since a large number of sets of a low-resolution image and a high-resolution image need to be prepared, a large number of steps for a preprocess of performing learning are required. In addition, since image data for learning needs to be created from actually captured images, image data may be spontaneously biased, which is not preferable for image conversion with a high degree of freedom.

SUMMARY OF THE INVENTION

An object of the present invention is to increase the degree of freedom of image conversion which employs a learning technique, as compared to the conventional art.

In the present invention, an image feature analysis is performed with respect to a first image. From an image feature of the first image, a value of an illumination equation parameter corresponding to the image feature is obtained as an original parameter value by referencing a relationship between image features and illumination equation parameters. The contents of an operation of an illumination equation parameter are determined, depending on a prescribed image conversion. The original parameter value is operated in accordance with the parameter operation contents, to obtain a new parameter value. A second image is generated based on the new parameter value.

According to the present invention, the value of the illumination equation parameter corresponding to the image feature of the first image is obtained as the original parameter value. The original parameter value is operated in accordance with the contents of an operation corresponding to a prescribed image conversion, thereby obtaining a new parameter value. Thereafter, a second image is obtained from the new parameter value. In other words, an image conversion is achieved by conversion of an illumination equation parameter, thereby making it possible to achieve an image conversion having a higher degree of freedom than in the conventional art without a limitation due to image data during learning. For example, in the case of image enlargement, among illumination equation parameters, the density of a surface normal vector representing information about a shape of an object may be increased. In this case, any arbitrary enlargement factor can be set. Also, in the case of conversion of an illumination direction, an illumination vector representing an illumination direction may be changed. In addition, conversion of a viewpoint direction and the like can be easily achieved by operating an illumination equation parameter. Also, although learning images corresponding to the types of image conversions are required in the conventional art, since image conversions are performed by parameter operations of an illumination equation in the present invention, the number of learning images can be suppressed.

Also, in the present invention, preferably, in a preprocess for learning a relationship between image features and illumination equation parameters, a value of an illumination equation parameter is set, a learning image is generated from the set parameter value, and an image feature obtained by performing an image feature analysis with respect to the learning image, is saved in association with the original parameter value into a database.

Thereby, in the preprocess, the learning image can be generated using the illumination equation by a computer. Therefore, it is not necessary to capture an image of a real object for generation of the learning image. Therefore, the process can be made simple and various learning images can be easily prepared.

Thus, according to the present invention, an image conversion is achieved by conversion of an illumination equation parameter, thereby making it possible to perform an image conversion having a high degree of freedom. Further, the number of learning images can be suppressed. Furthermore, in a preprocess, various learning images can be easily prepared.

BRIEF DESCRIPTION OF THE DRAWINGS

FIG. 5 is a diagram illustrating an exemplary parameter operation for an image conversion.

FIG. 6 is a diagram illustrating an exemplary edge portion caused by overlapping of two objects.

DETAILED DESCRIPTION OF THE PREFFERED EMBODYMENTS

Figure 1:
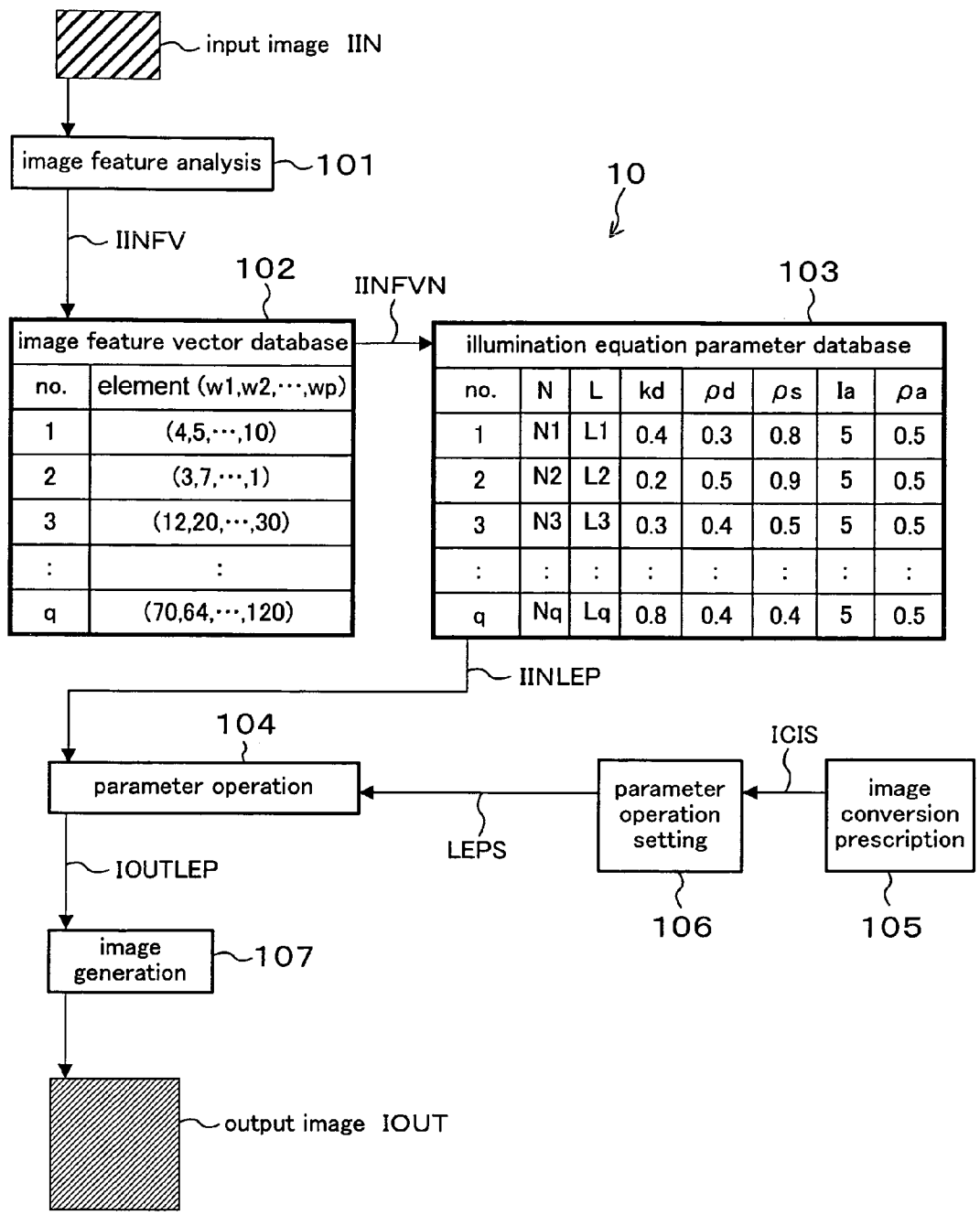
FIG. 1 is a block diagram illustrating an image converting apparatus according to a first embodiment of the present invention.

According to a first embodiment of the present invention, a method is provided for converting a first image into a second image. The method comprises a first step of performing an image feature analysis with respect to the first image, a second step of referencing a relationship between image features and illumination equation parameters, and from an image feature of the first image obtained in the first step, obtaining a value of an illumination equation parameter corresponding to the image feature, as an original parameter value, a third step of determining contents of an operation of an illumination equation parameter, depending on a prescribed image conversion, a fourth step of operating the original parameter value in accordance with the operation contents determined in the third step, to obtain a new parameter value, and a fifth step of generating the second image based on the new parameter value.

According to a second embodiment of the present invention, in the image converting method of the first embodiment, the image feature analysis in the first step is performed using a spatial frequency analysis.

According to a third embodiment of the present invention, the image converting method of the first embodiment comprises a preprocess of learning a relationship between image features and illumination equation parameters. The preprocess comprises the steps of setting a first parameter value as a value of an illumination equation parameter, generating a learning image from the first parameter value, and performing an image feature analysis substantially equivalent to the first step, with respect to the learning image. The obtained image feature is saved in association with the first parameter value into a database.

According to a fourth embodiment of the present invention, in the image converting method of the third embodiment, the first parameter value is set, assuming an illumination equation parameter when the first image is captured.

According to a fifth embodiment of the present invention, in the image converting method of the first embodiment, the illumination equation represents a luminance in a viewpoint direction by an addition of a diffuse reflection component, a specular reflection component, and an ambient light component.

According to a sixth embodiment of the present invention, in the image converting method of the first embodiment, the illumination equation parameter includes at least one of a surface normal vector, an illumination vector, a ratio of a diffuse reflection component to a specular reflection component, a reflectance of a diffuse reflection component, and a reflectance of a specular reflection component.

According to a seventh embodiment of the present invention, in the image converting method of the first embodiment, the third step, when the prescribed image conversion is image enlargement, determines, as the contents of an operation of an illumination equation parameter, to increase a density of at least one of a surface normal vector, an illumination vector, a ratio of a diffuse reflection component to a specular reflection component, a reflectance of a diffuse reflection component, and a reflectance of a specular reflection component.

According to an eighth embodiment of the present invention, in the image converting method of the first embodiment, the relationship between image features and illumination equation parameters is represented by a plurality of image feature vectors and a plurality of parameter values associated with the respective image feature vectors, and the second step comprises the steps of selecting a predetermined number of image feature vectors similar to a first image feature vector representing the image feature of the first image, from the plurality of image feature vectors, obtaining a distance between the first image feature vector and each of the predetermined number of image feature vectors, and performing a weighted addition of parameter values corresponding to the predetermined number of image feature vectors, respectively, depending on the distances obtained with respect to the respective image feature vectors, to calculate the original parameter value.

According to a ninth embodiment of the present invention, an image converting method is provided which comprises an image feature analyzing section for performing an image feature analysis with respect to an input image to output a first image feature vector representing an image feature of the input image, a parameter output section for storing a plurality of image feature vectors, and a plurality of parameters corresponding to the respective image feature vectors, of an illumination equation, and when receiving the first image feature vector, outputting an original parameter value corresponding to the first image feature vector, a parameter operation setting section for determining contents of an operation of an illumination equation parameter, depending on a prescribed image conversion, a parameter operating section for operating the original parameter value output from the parameter output section in accordance with the operation contents determined by the parameter operation setting section, to obtain a new parameter value, and an image generating section for generating an output image based on the new parameter value output from the parameter operating section.

According to a tenth embodiment of the present invention, in the image converting apparatus of the ninth embodiment, the parameter output section comprises an image feature vector database storing the plurality of image feature vectors and an illumination equation parameter database storing the plurality of parameters.

According to an eleventh embodiment of the present invention, a server-client system for performing an image conversion is provided. The system comprises a server having the image feature analyzing section, the parameter output section, the parameter operation setting section and the parameter operating section of the ninth embodiment, and a client having the image generating section of the ninth embodiment. The client prescribes contents of the image conversion to the server.

According to a twelfth embodiment of the present invention, a mobile apparatus is provided which comprises a camera, an image feature analyzing section for performing an image feature analysis with respect to an image captured by the camera, and outputting a first image feature vector representing a feature of the image, and an image feature vector database for storing a plurality of image feature vectors along with numbers, specifying an image feature vector similar to the first image feature vector, and outputting a number thereof. The mobile apparatus transmits the number output from the image feature vector database.

According to a thirteenth embodiment of the present invention, a program which causes a computer to execute a method for converting a first image into a second image, is provided. The program causes a computer to execute a first step of performing an image feature analysis with respect to the first image, a second step of referencing a relationship between image features and illumination equation parameters, and from an image feature of the first image obtained in the first step, obtaining a value of an illumination equation parameter corresponding to the image feature, as an original parameter value, a third step of determining contents of an operation of an illumination equation parameter, depending on a prescribed image conversion, a fourth step of operating the original parameter value in accordance with the operation contents determined in the third step, to obtain a new parameter value, and a fifth step of generating the second image based on the new parameter value.

Hereinafter, embodiments of the present invention will be described with reference to the accompanying drawings.

First Embodiment

FIG. 1 is a block diagram illustrating an image converting apparatus according to a first embodiment of the present invention. In FIG. 1, an image feature analyzing section 101 performs an image feature analysis with respect to an input image IIN to generate an input image feature vector IINFV. An image feature vector database 102 stores a plurality of image feature vectors. An illumination equation parameter database 103 stores a plurality of parameter values of a predetermined illumination equation which are associated with each of the image feature vectors stored in the image feature vector database 102. In other words, a relationship between image features and the illumination equation parameters is prepared. The image feature vector database 102 and the illumination equation parameter database 103 output values of illumination equation parameters corresponding to the input image feature vector IINFV as original parameter values IINLEP. The image feature vector database 102 and the illumination equation parameter database 103 constitute a parameter output section 10.

An image conversion prescribing section 105 outputs the contents of an image conversion which is prescribed externally, for example, as an image conversion prescribing signal ICIS. A parameter operation setting section 106 determines the contents of an operation for the illumination equation parameters, depending on the image conversion prescribed by the image conversion prescribing signal ICIS, and outputs the contents as a parameter operation prescribing signal LEPS. A parameter operating section 104 operates the original parameter value IINLEP in accordance with the contents of the operation prescribed by the parameter operation prescribing signal LEPS to generate new parameter values IOUTLEP. An image generating section 107 calculates the illumination equation using the new parameter values IOUTLEP to generate an output image IOUT.

In other words, the input image IIN (first image) is converted into the output image IOUT (second image) by conversion of the illumination equation parameters.

Figure 2:
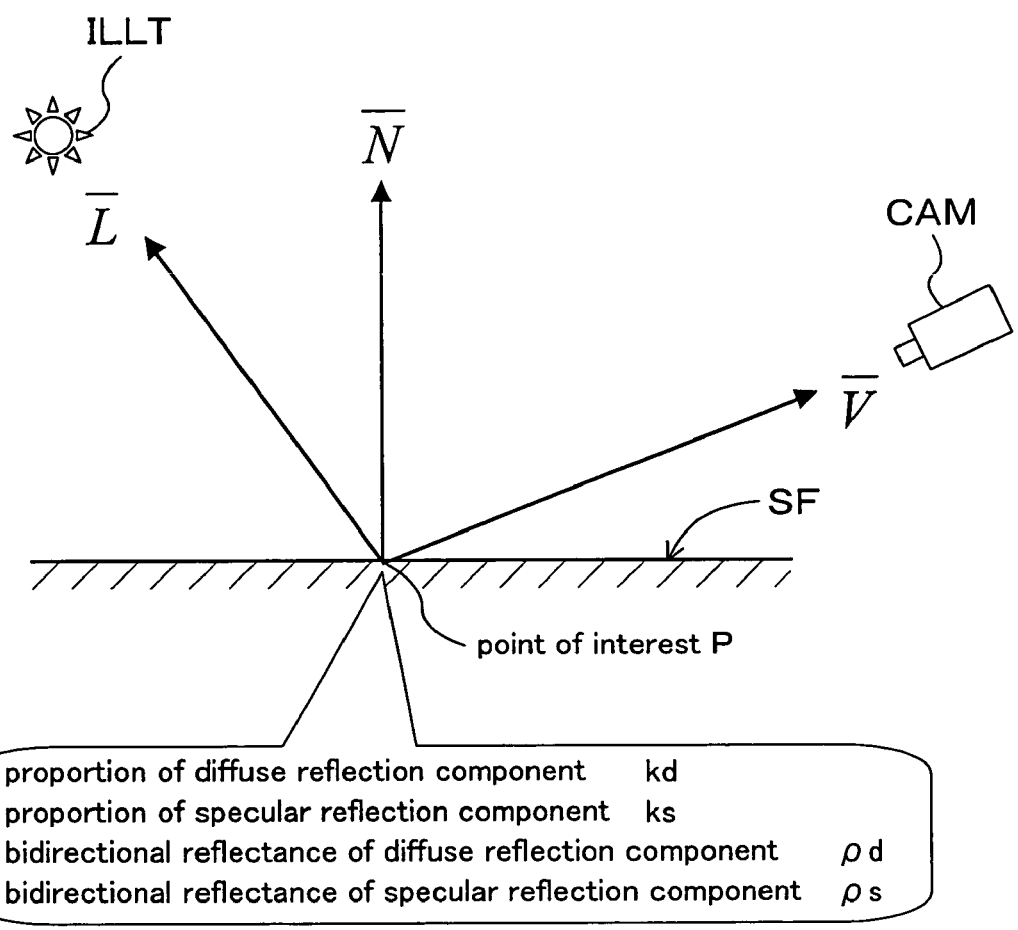
FIG. 2 is a diagram for explaining geometric conditions and optical conditions for an illumination equation.

Here, the following illumination equation is used, assuming geometric conditions and optical conditions as described in FIG. 2:

$$I_v = \rho_a I_a + I_i (\overline{N} \cdot \overline{L}) d\omega (k_d \rho_d + k_s \rho_s) \quad (1)$$

where Iv represents a luminance in a viewpoint direction (viewpoint vector V), Ia represents a luminance of ambient light, $\rho a$ represents a reflectance of ambient light, Ii represents a luminance of illumination, N represents a surface normal vector, L represents an illumination vector indicating an illumination direction, $d\omega$ represents a solid angle of illumination, $\rho d$ represents a reflectance of a diffuse reflection component, $\rho s$ represents a reflectance of a specular reflection component, and kd and ks represent proportions of the diffuse reflection component and the specular reflection component, and have a relationship of kd+ks=1. The viewpoint vector V coincides with an optical axis of a camera CAM, and has, as its start point, a point of interest P on an object surface SF. The ambient light refers to incident light diffracted from a periphery to the current point of interest P on the object surface SF due to multiple reflection or the like, i.e., a bias component of the luminance Iv of the viewpoint direction (vector V). Light enters the point of interest P from illumination with an irradiance represented by:

$$I_i (\overline{N} \cdot \overline{L}) d\omega \quad (1A).$$

The incident light is reflected at a rate of kd$\rho$d with respect to the diffuse reflection component and at a rate of ks$\rho$s with respect to the specular reflection component.

In the illumination equation parameter database 103 of FIG. 1, seven parameters, i.e., the surface normal vector N, the illumination vector L, the diffuse reflection component proportion kd, the diffuse reflection component reflectance $\rho$d, the specular reflection component reflectance $\rho$s, the ambient light luminance Ia, and the ambient light reflectance $\rho$a, are set. Note that the definition and parameter types of the illumination equation of the present invention are not limited to those described herein, and any arbitrary illumination equation and parameters are applicable.

Figure 3:
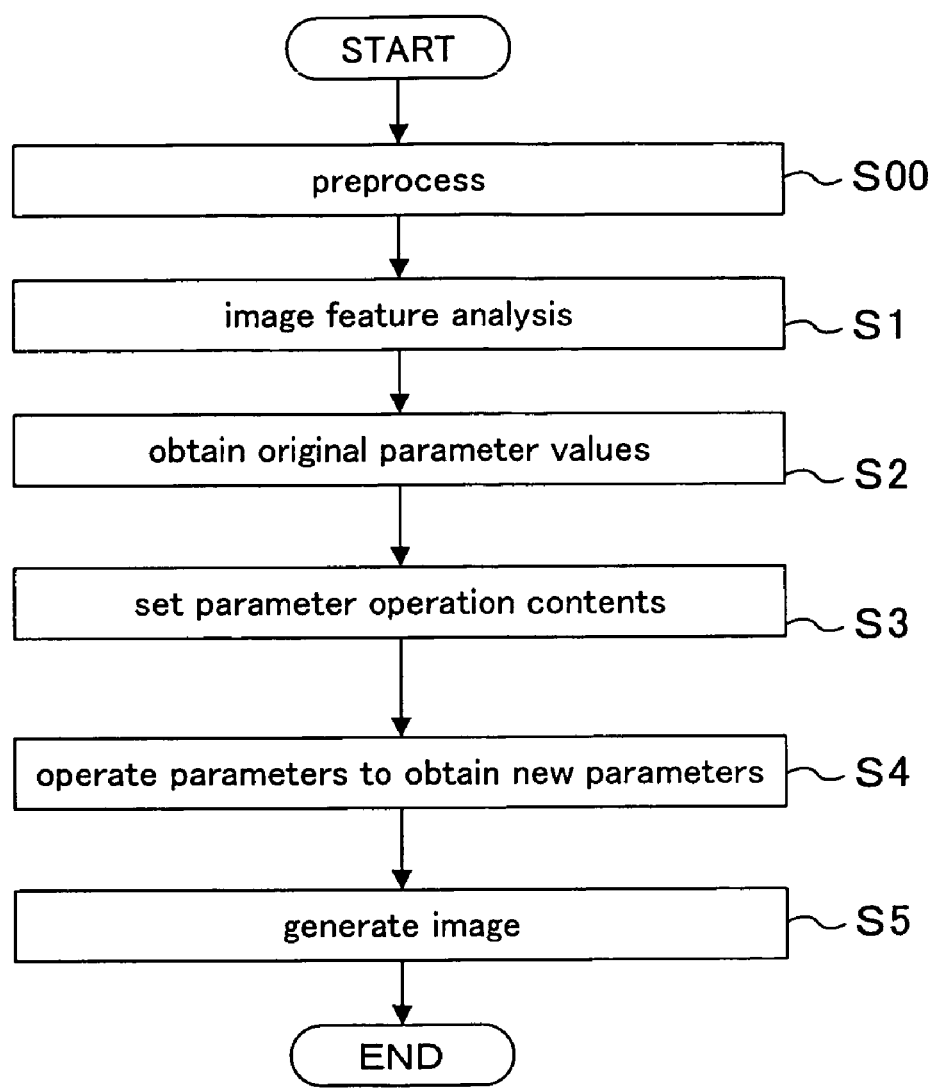
FIG. 3 is a flowchart illustrating the image converting method of the first embodiment of the present invention.

FIG. 3 is a flowchart illustrating an operation of the image converting apparatus of FIG. 1, i.e., the image converting method according to this embodiment. Note that the image converting method of this embodiment can be implemented by causing a computer to execute a program for achieving the method.

Initially, in a preprocess S00, a relationship between image features and illumination equation parameters is learnt. The preprocess S00 will be described in detail elsewhere below. It is here assumed that the image feature vector database 102 and the illumination equation parameter database 103 as illustrated in FIG. 1 are already obtained by previously performing learning.

Figure 4:
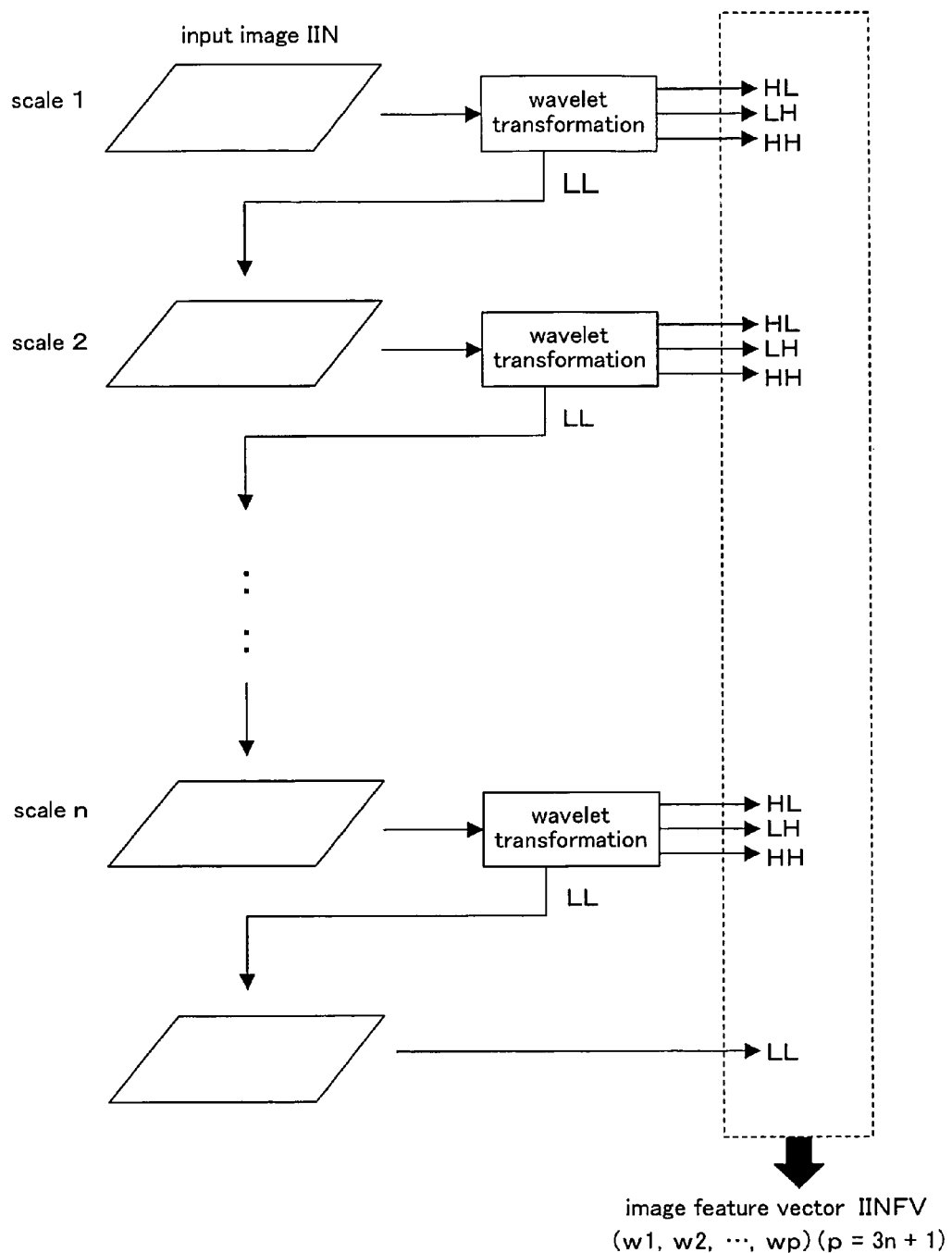
FIG. 4 is a diagram illustrating an image feature analysis employing wavelet transformation.

In step S1, the image feature analyzing section 101 performs an image feature analysis with respect to the input image IIN (first image). As used herein, the image feature analysis is performed using, for example, a spatial frequency analysis, such as wavelet transformation (see FIG. 4) or the like. In this case, an image feature is represented by multiple resolution representation. In the example of FIG. 4, outputs HL, LH, HH and LL of wavelet transformation are calculated in each of n times of scaling, and these are grouped for each hierarchical layer to obtain a (3n+1)-dimensional vector as the input image feature vector IINFV (first image feature vector). Note that, since the image feature vector IINFV is required for each pixel, the LL image is caused to have the same size in each scale. Methods for analysis and representation of image features in the present invention are not limited to those, and any arbitrary method is applicable.

Next, in step S2, from the input image feature vector IINFV obtained in step S1, values of illumination equation parameters corresponding thereto is obtained as the original parameter values IINLEP with reference to the image feature vector database 102 and the illumination equation parameter database 103 previously obtained by learning. Here, initially, the image feature vector database 102 selects an image feature vector closest to the input image feature vector IINFV from q stored image feature vectors, and outputs a number assigned to the selected image feature vector as an input image feature vector number IINFVN. Thereafter, the illumination equation parameter database 103 receives the input image feature vector number IINFVN, reads out parameter values corresponding to this, and outputs the parameter values as the original parameter values IINLEP.

Next, in step S3, the parameter operation setting section 106 determines the contents of an operation of illumination equation parameters, depending on a prescribed image conversion. Thereafter, in step S4, the parameter operating section 104 operates the original parameter values IINLEP obtained in step S2 in accordance with the operation contents determined in step S3, to obtain the new parameter values IOUTLEP.

FIG. 5 is a diagram illustrating an exemplary parameter operation where the original parameter values IINLEP and the new parameter values IOUTLEP corresponding to one line are written and arranged for each pixel. The above-described seven parameters are determined for each pixel, and the ambient light luminance Ia, the ambient light reflectance ρa, and the illumination vector L are common to each pixel. The diffuse reflection component proportion kd, the diffuse reflection component reflectance ρd, and the specular reflection component reflectance ρs depend on a material of an object, to each of which, therefore, a subscript indicating a material type is attached. Also, for the surface normal vector N of the original parameter value IINLEP, the first subscript indicates a material type, and the second subscript indicates a difference between pixels in the same material.

It is now assumed that the image conversion prescribing signal ICIS is used to prescribe an image conversion that "enlarge an image by an enlargement ratio of 2". In this case, the parameter operation setting section 106 replaces the image conversion that "enlarge an image by an enlargement ratio of 2" with a parameter operation that "increase the density of the surface normal vector N by a factor of 2", and supplies this as the parameter operation prescribing signal LEPS to the parameter operating section 104.

The parameter operating section 104 increases the density of the surface normal vector N by a factor of 2 in accordance with the parameter operation prescribing signal LEPS. Specifically, while the number of pixels is u in the original parameter values IINLEP, the number of pixels is 2u in the new parameter values IOUTLEP. Since a parameter depending on a material of an object does not depend on the resolution, the original parameter values IINLEP may be transferred directly to the new parameter values IOUTLEP. Specifically, the new parameter values IOUTLEP of the diffuse reflection component proportion kd, the diffuse reflection component reflectance ρd and the specular reflection component reflectance ρs are the same as the original parameter values IINLEP. On the other hand, since the normal vector N is a parameter depending on the resolution, a third subscript is added to the surface normal vector N of the new parameter values IOUTLEP so as to represent a difference between pixels after the increasing of the density. In this case, since a boundary between materials (e.g., between a pixel 2 and a pixel 3 in the original parameter values IINLEP) is highly likely to be an edge portion caused by an overlap of two objects (an object 601 made of a material 1 and an object 602 made of a material 2) as illustrated in FIG. 6, this boundary condition is preferably held after the increasing of the density. Specifically, a pixel 4 and a pixel 5 of the new parameter values IOUTLEP are caused to coincide with the pixel 2 and the pixel 3 of the original parameter values IINLEP, respectively. Specifically, in order to hold the boundary condition, the following is assumed:

$N_{1, 2} = N_{1, 2, 2}$ and $N_{2, 1} = N_{2, 1, 1}$.

Figure 7A:
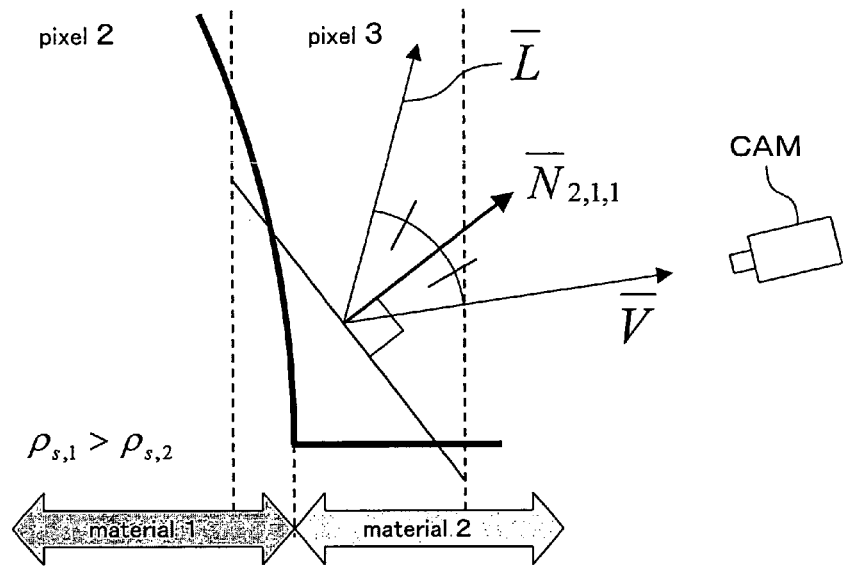
FIGS. 7A and 7B are diagrams illustrating occurrence of an error in a specular reflection component due to material incorporation, and an exemplary method for canceling the error.
Figure 7B:
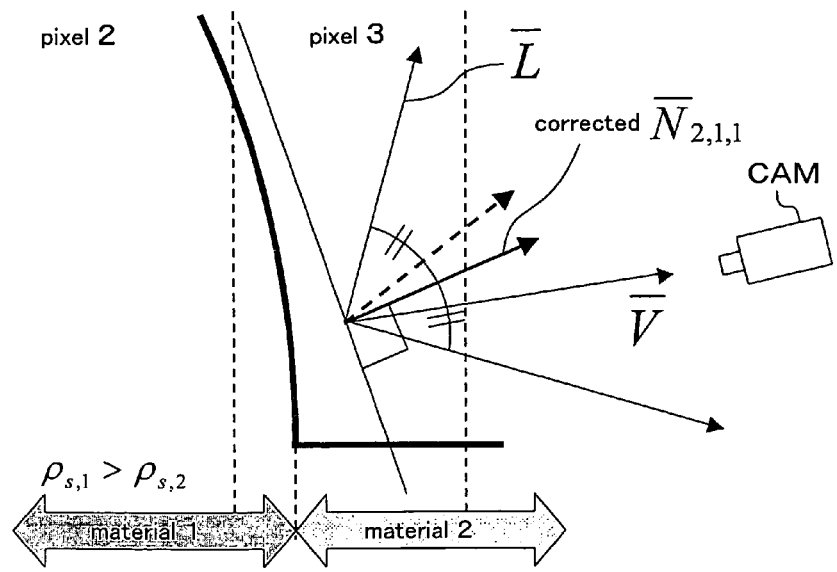

Note that it is rare that a boundary between image capturing elements of a camera coincides with a boundary between two objects, and in the case of FIG. 6, the material 1 is incorporated into a portion of the pixel 3. This error can be canceled with the normal vector N of IOUTLEP. Specifically, as illustrated in FIG. 7A, when the specular reflection component reflectance $ρ_{s,\ 1}$ of the material 1 is higher than the specular reflection component reflectance $ρ_{s,\ 2}$ of the material 2, since the pixel 3 of IINLEP includes an error which increases the luminance, the normal vector $N_{2,\ 1,\ 1}$ is caused to be more distant from a positive reflection direction to decrease the luminance, thereby canceling the error, as illustrated in FIG. 7B. On the other hand, when the specular reflection component reflectance $ρ_{s,\ 1}$ of the material 1 is lower than the specular reflection component reflectance $ρ_{s,\ 2}$ of the material 2, since the pixel 3 of IINLEP includes an error which decreases the luminance, the normal vector is moved from that of FIG. 7B to that of FIG. 7A. An intensity of diffuse reflection is represented by expression (1A) in expression (1).

$$I_i(\overline{N} \cdot \overline{L})d\omega \qquad (1A)$$

Figure 8A:
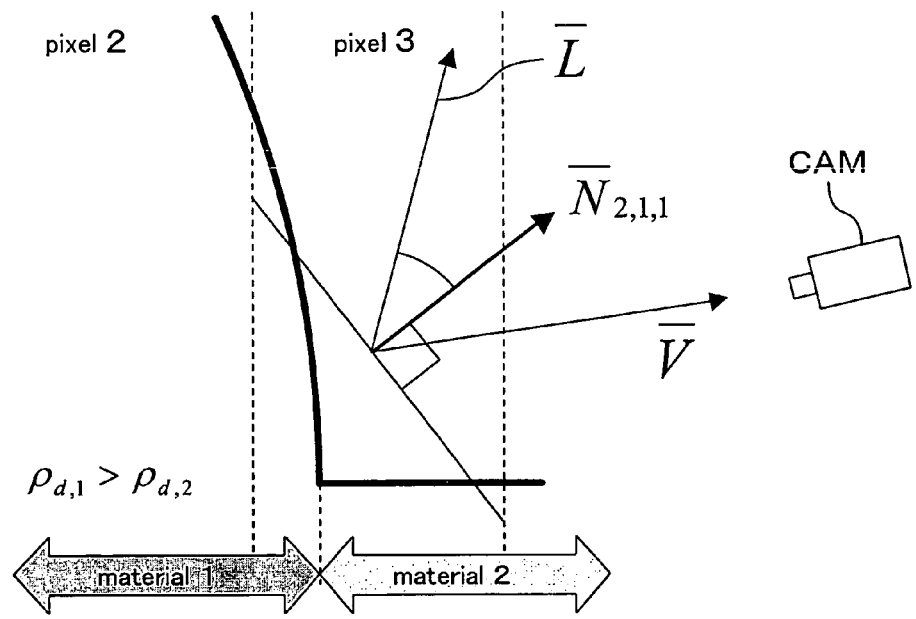
FIGS. 8A and 8B are diagrams illustrating occurrence of an error in a specular reflection component due to material incorporation, and an exemplary method for canceling the error.
Figure 8B:
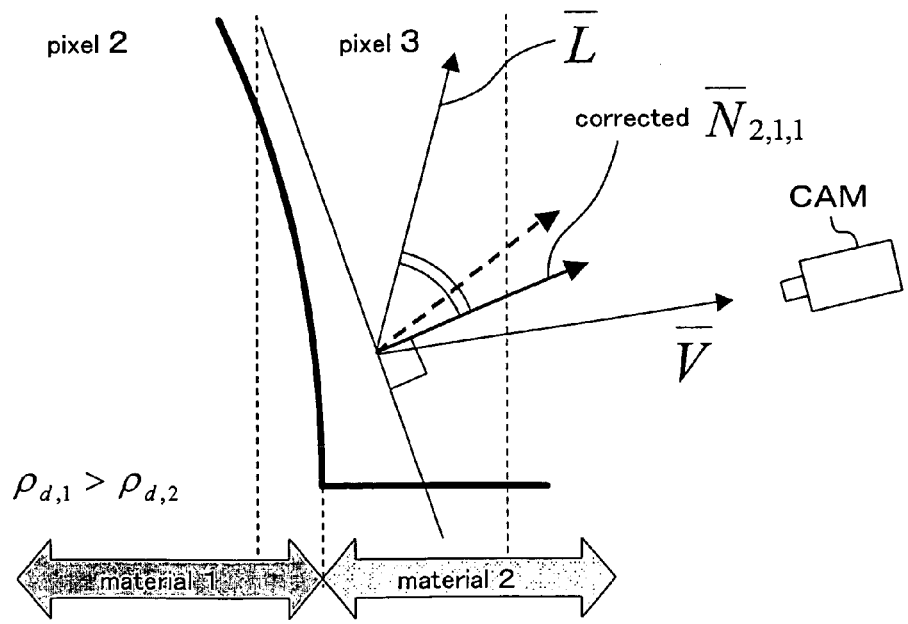

Thus, the intensity of diffuse reflection is determined by an inner product (N·L) of the normal vector N and the illumination vector L, and therefore, is determined irrespective of the direction of the viewpoint vector V. Therefore, as illustrated in FIG. 8A, when the diffuse reflection component reflectance $ρ_{d,\ 1}$ of the material 1 is higher than the diffuse reflection component reflectance $ρ_{d,\ 2}$ of the material 2, since the pixel 3 of IINLEP includes an error which increases the luminance, the normal vector $N_{2,\ 1,\ 1}$ is caused to be more distant from the illumination vector L to decrease the luminance, thereby canceling the error, as illustrated in FIG. 8B. When the diffuse reflection component reflectance $ρ_{d,\ 1}$ of the material 1 is lower than the diffuse reflection component reflectance $ρ_{d,\ 2}$ of the material 2, since the pixel 3 of IINLEP includes an error which decreases the luminance, the normal vector is moved from that of FIG. 8B to that of FIG. 8A. Note that the balance between specular reflection and diffuse reflection can be controlled using the diffuse reflection component proportion $k_{d,\ 2}$.

As illustrated in FIG. 6, a surface shape CSF possessed by the object 601 is represented by a broken-line shape LF using discrete normal vectors, so that a quantization error occurs. Therefore, for example, although the pixel 3 of IINLEP originally has an edge 603 at which the object 601 intersects the object 602, the sharpness is deteriorated as illustrated by an edge 606 provided by a surface 604 indicated by the normal vector $N_{2,\ 1}$ and a surface 605 indicated by a normal vector $N_{2,\ 2}$. Therefore, the sharpness of the edge 606 can be improved by adjusting the direction of the normal vector $N_{2,\ 1}$ or $N_{2,\ 2}$. Therefore, the control of the normal vector has an effect of edge emphasis in addition to correction of a luminance error due to material incorporation described in FIGS. 7A and 7B and FIGS. 8A and 8B, so that the normal vector is controlled, comprehensively taking the two effects into consideration. As an exemplary method of controlling the normal vector, there is a method of referencing a database previously generated by learning employing examples, or the like. Specifically, a plurality of sample subjects are used to measure normal vector data in which the larger number of pixels is two times larger than the smaller number of pixels, thereby obtaining low-density normal vector data and high-density normal vector data. A relationship between the low-density normal vector data and the high-density normal vector data is saved into a database, and when edge emphasis is executed, the high-density normal vector data is obtained from the low-density normal vector data.

Figure 9:
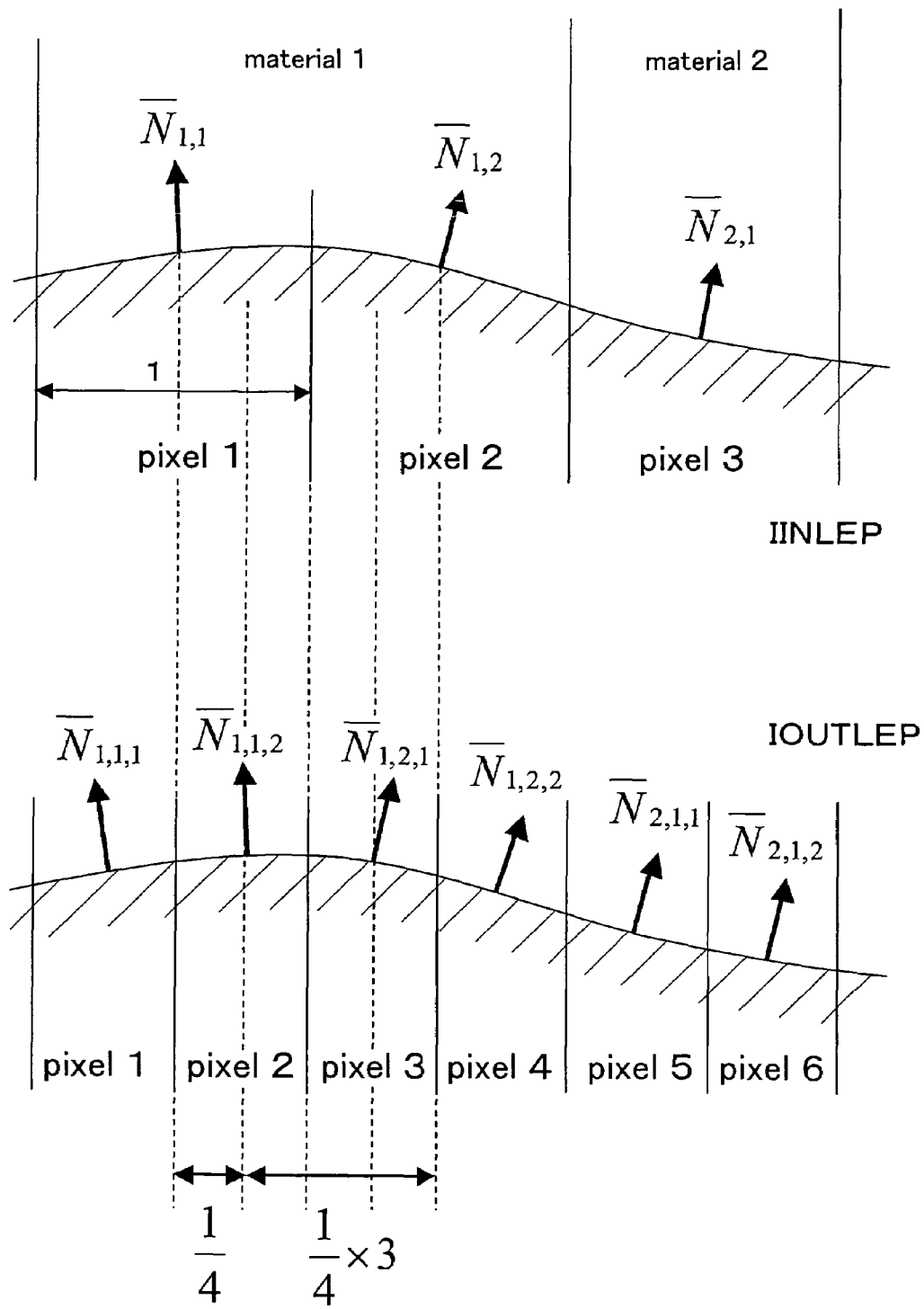
FIG. 9 is a diagram illustrating an exemplary method for interpolating surface normal vectors for double enlargement.

Normal vectors N which are located within the same material but not at a material boundary (e.g., $N_{1,\ 1,\ 2}$ and $N_{1,\ 2,\ 1}$) are calculated by an interpolation calculation in accordance with the following expression, assuming that the surface shape is smoothly changed as illustrated in FIG. 9. For example, in the case of $N_{1,1,2}$, the following expression is satisfied.

$$\overline{N}_{1,1,2} = \frac{3}{4}\overline{N}_{1,1} + \frac{1}{4}\overline{N}_{1,2} \quad (2)$$

Specifically, the normal vector $N_{1,1,2}$ of the pixel 2 of IOUTLEP is interpolated from the normal vectors $N_{1,1}$ and $N_{1,2}$ closest thereto in IINLEP. Weights ¾ and ¼ for interpolation are calculated from a distance from $N_{1,1,2}$ to $N_{1,1}$ and a distance from $N_{1,1,2}$ to $N_{1,2}$ which are measured in units of a sub-pixel of OUTLEP. In FIG. 9, since space density is increased by a factor of 2, when a size of a pixel of IINLEP is assumed to be one, the sub-pixel of IOUTLEP has a size of ¼. Therefore, the distance from $N_{1,1,2}$ to $N_{1,1}$ is ¼ and the distance from $N_{1,1,2}$ to $N_{1,2}$ is ¾, so that ¼ is a weight for $N_{1,2}$ and ¾ is a weight for $N_{1,1}$, whereby expression (2) is obtained.

Figure 10:
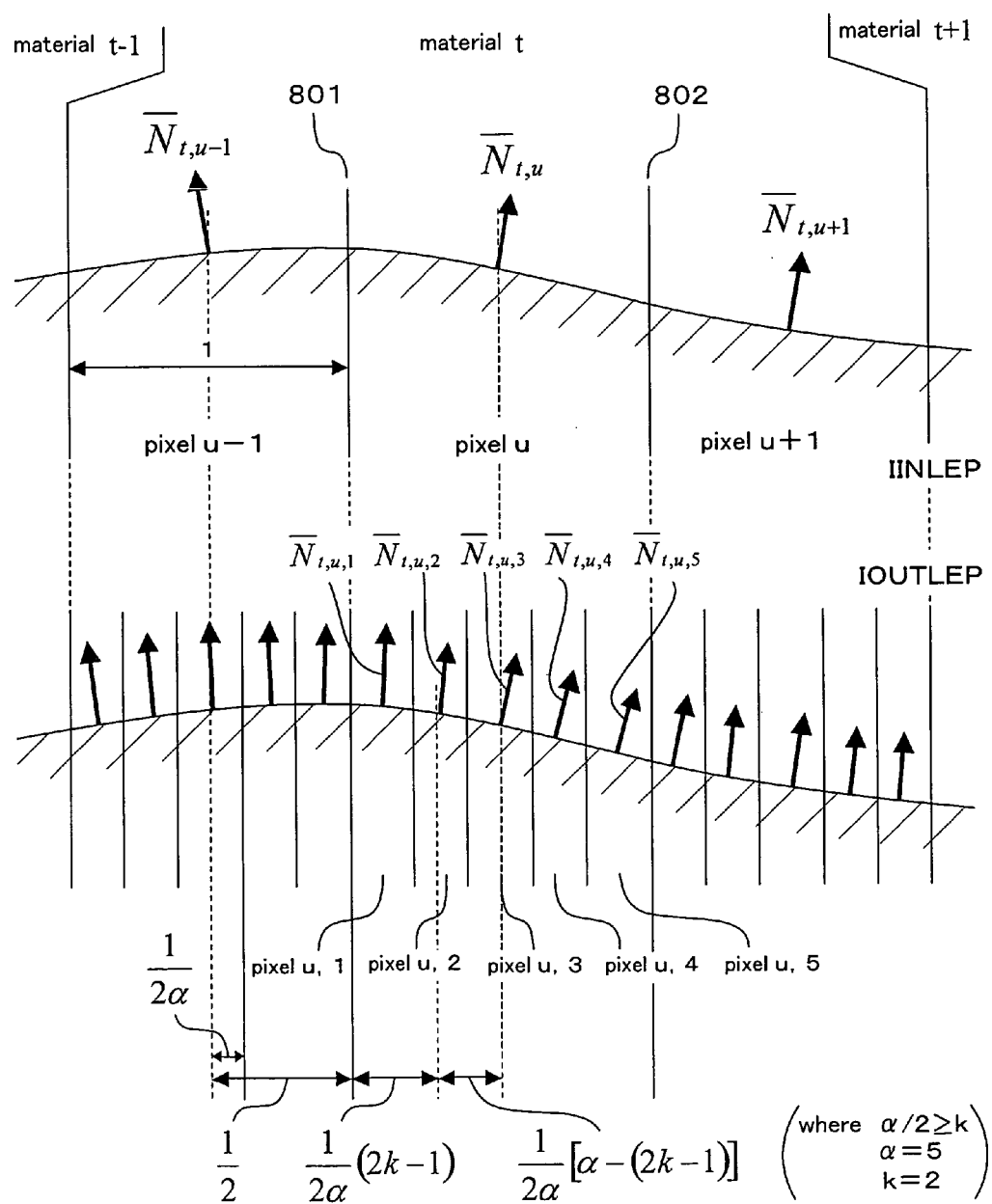
FIG. 10 is a diagram illustrating an exemplary method for generalizing expression (2) with respect to an image enlargement ratio.

A method of generalizing expression (2) with respect to an image enlargement ratio will be described with reference to FIGS. 10 and 11. FIG. 10 illustrates the case where a pixel u of IINLEP is enlarged by a factor of 5, so that five pixels (u,1), (u, 2), (u, 3), (u, 4), and (u, 5) are generated in IOUTLEP. The generalization of the image enlargement ratio is to change the number of pixels of IOUTLEP into an arbitrary number. Here, a method of generating α pixels in IOUTLEP where the image enlargement ratio is α, will be described. Therefore, although it is assumed that α=5 in FIG. 10, an expression for interpolation when the image enlargement ratio is an arbitrary value, will be hereinafter described, which corresponds to the generalization of expression (2). In the interpolation calculation of expression (2), the pixels 1 and 2 are selected as neighboring pixels in IINLEP, with respect to the pixel 2 of IOUTLEP. This is generalized in FIGS. 10 and 11.

Pixels of IOUTLEP to be calculated by interpolation calculation is represented by images (u, k) (k=1, 2, . . . , α). In FIG. 10, it is assumed that α=5, so that the images (u, k) correspond to 5 pixels (u, 1), (u, 2), (u, 3), (u, 4) and (u, 5). Neighboring normal vectors in IINLEP of a normal vector $N_{t,u,k}$ possessed by the pixel (u, k) of IOUTLEP are a combination of "normal vectors $N_{t,u-1}$ and $N_{t,u}$" or "normal vectors $N_{t,u}$ and $N_{t,u+1}$" Since the pixel (u, k) of IOUTLEP is invariably included in the pixel u of IINLEP, the normal vector $N_{t,u}$ of the pixel u of IINLEP is invariably selected. A second neighboring normal vector is either the normal vector $N_{t,u-1}$ or $N_{t,u+1}$ of pixels u−1 and u+1 of IINLEP. This selection is determined, depending on which of the pixel u−1 and the pixel u+1 of IINLEP the pixel (u, k) of IOUTLEP is closer to. Specifically, as in the example of FIG. 10, when α/2≧k, since the pixel (u, k) of IOUTLEP is closer to the pixel u−1 of IINLEP, "the normal vectors $N_{t,u-1}$ and $N_{t,u}$" are selected. On the other hand, as in the example of FIG. 11, when α/2<k, since the pixel (u, k) of IOUTLEP is closer to the pixel u+1 of IINLEP, "the normal vectors $N_{t,u}$ and $N_{t,u+1}$" are selected.

Weights for interpolation calculation are calculated based on the size of a sub-pixel of IOUTLEP where the size of a pixel of IINLEP is assumed to be one, as is similar to FIG. 9. One pixel of IINLEP is changed into α pixels of IOUTLEP by the image enlargement ratio α (i.e., the density is increased). The size of a sub-pixel of IOUTLEP is 1/(2α). A boundary between the pixel u−1 and the pixel u of IINLEP is indicated by 801, and a boundary between the pixel u and the pixel u+1 of IINLEP is indicated by 802. In the case of FIG. 10 (α/2≧k, α=5, k=2), a distance between the normal vector $N_{t,u-1}$ and the boundary 801 is the size of a sub-pixel of IINLEP, i.e., ½. A distance between the boundary 801 and the normal vector $N_{t,u,k}$ corresponds to (2k−1) sub-pixels of IOUTLEP, i.e., (2k−1)/(2α). A distance between the normal vector $N_{t,u,k}$ and the normal vector $N_{t,u}$ can be calculated by subtracting the distance between the boundary 801 and the normal vector $N_{t,u,k}$ from the distance between the boundary 801 and the normal vector $N_{t,u}$, i.e., [α−(2k−1)]/(2α). Accordingly, a weight with respect to the normal vector $N_{t,u-1}$ is [α−(2k−1)]/(2α), and a weight with respect to the normal vector $N_{t,u}$ is [½+(2k−1)/(2α)]. Therefore, the normal vector $N_{t,u,k}$ can be calculated by interpolation represented by:

$$\overline{N}_{t,u,k} = \frac{1}{2\alpha}[\alpha - (2k-1)]\overline{N}_{t,u-1} + \left[\frac{1}{2} + \frac{1}{2\alpha}(2k-1)\right]\overline{N}_{t,u} \quad (3)$$

$$\Leftrightarrow \overline{N}_{t,u,k} = \frac{\alpha - 2k + 1}{2\alpha}\overline{N}_{t,u-1} + \frac{\alpha + 2k - 1}{2\alpha}\overline{N}_{t,u},$$

where $\frac{\alpha}{2} \geq k$.

Figure 11:
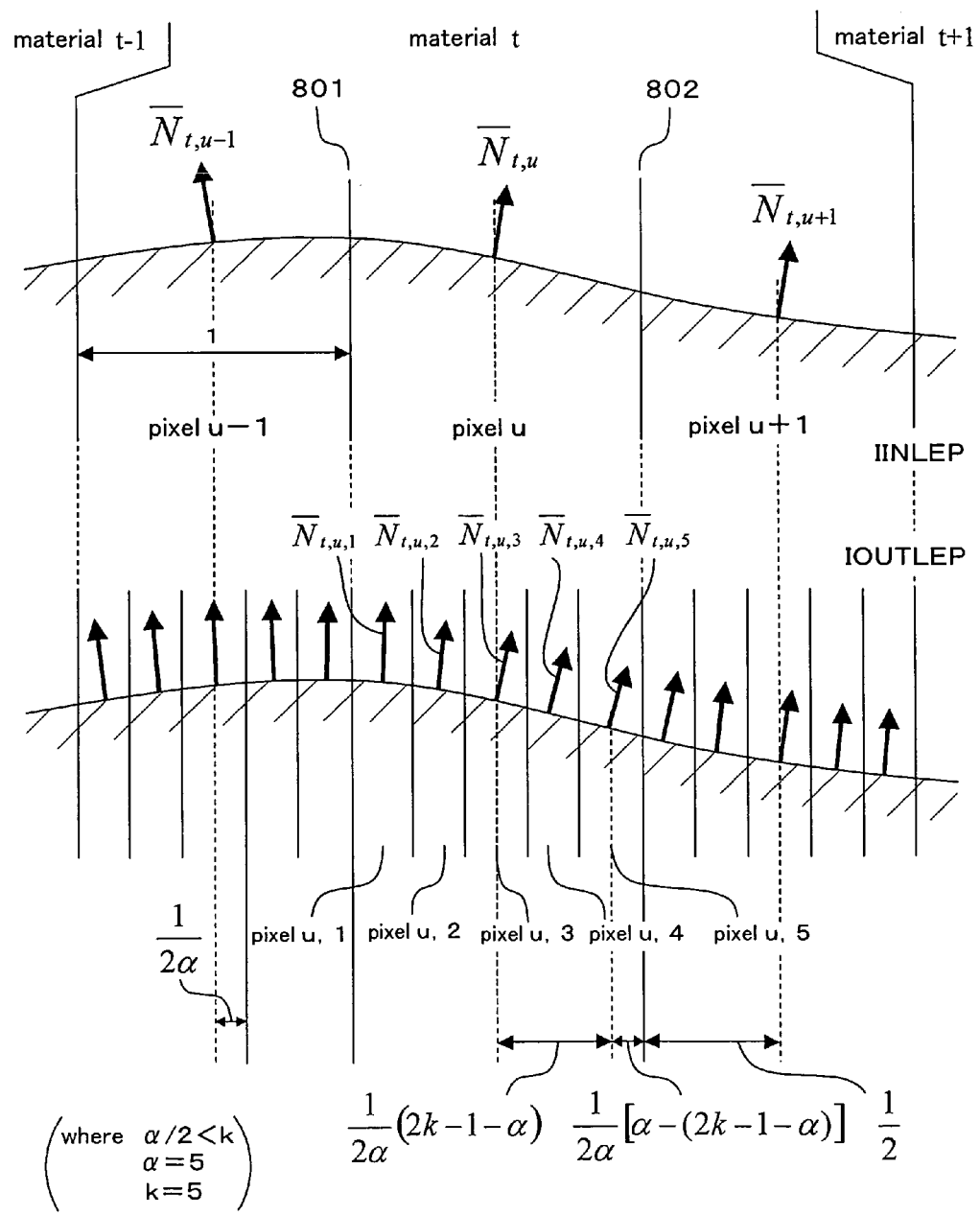
FIG. 11 is a diagram illustrating an exemplary method for generalizing expression (2) with respect to an image enlargement ratio.

On the other hand, in the case of FIG. 11 (α/2<k, α=5, k=5), a distance between the boundary 802 and the normal vector $N_{t,u+1}$ is the size of a sub-pixel of IINLEP, i.e., ½. Also, a distance between the normal vector $N_{t,u}$ and the normal vector $N_{t,u,k}$ corresponds to (2k−1−α) sub-pixels of IOUTLEP, i.e., (2k−1−α)/(2α). A distance between the boundary 802 and the normal vector $N_{t,u,k}$ can be calculated by subtracting the distance between the normal vector $N_{t,u}$ and the normal vector $N_{t,u,k}$ from the distance between the boundary 802 and the normal vector $N_{t,u}$, i.e., [α−(2k−1−α)]/(2α). Accordingly, a weight with respect to the normal vector $N_{t,u}$ is [½+{α−(2k−1−α)}/(2α)], and a weight with respect to the normal vector $N_{t,u+1}$ is (2k−1−α)/(2α), whereby the normal vector $N_{t,u,k}$ can be calculated by interpolation represented by:

$$\overline{N}_{t,u,k} = \left[\frac{1}{2} + \frac{1}{2\alpha}\{\alpha - (2k-1-\alpha)\}\right]\overline{N}_{t,u} + \frac{1}{2\alpha}(2k-1-\alpha)\overline{N}_{t,u+1} \quad (4)$$

$$\Leftrightarrow \overline{N}_{t,u,k} = \frac{3\alpha - 2k + 1}{2\alpha}\overline{N}_{t,u} + \frac{2k - 1 - \alpha}{2\alpha}\overline{N}_{t,u+1},$$

where $\frac{\alpha}{2} < k$.

Figure 12:
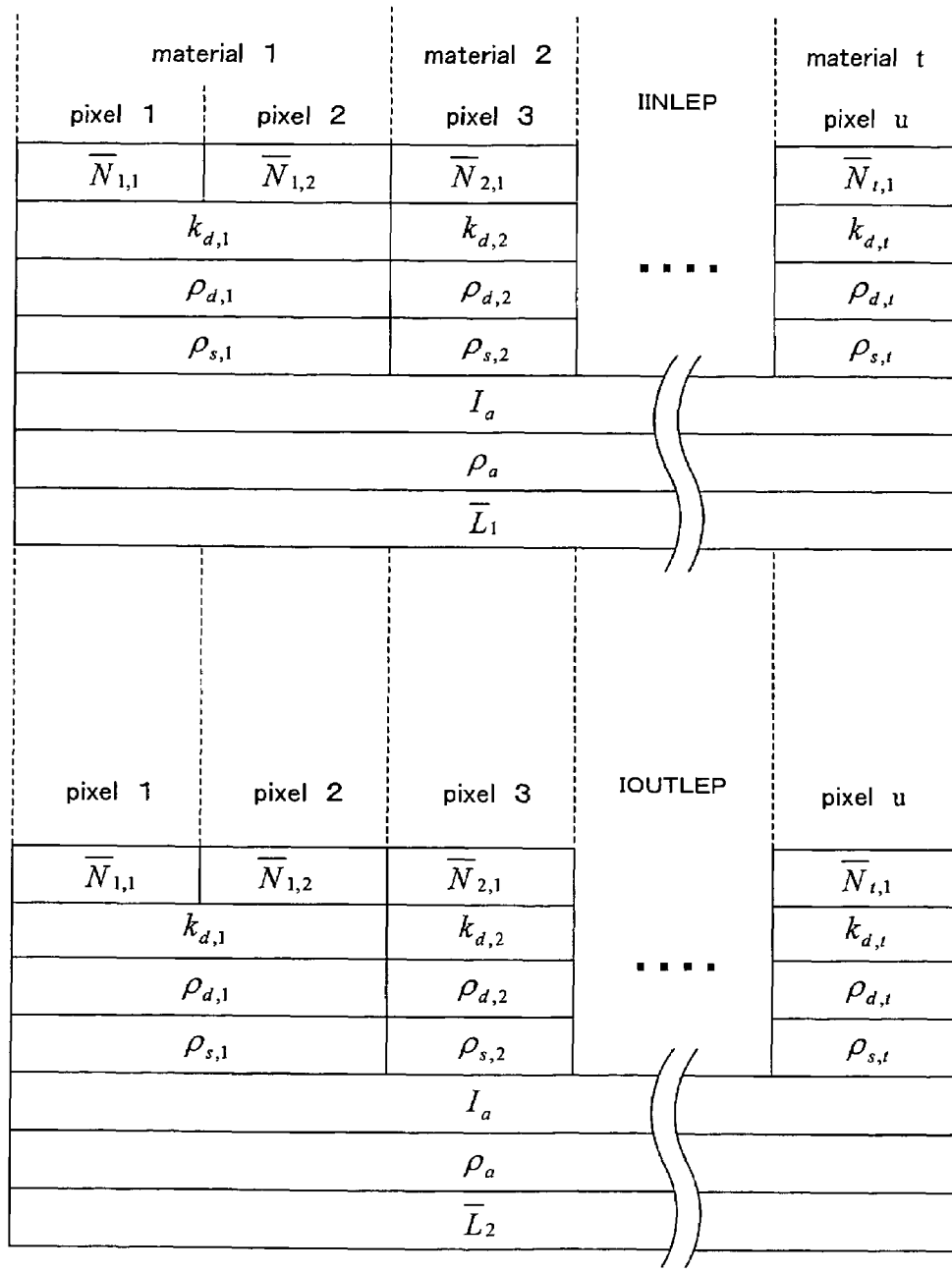
FIG. 12 is a diagram illustrating a second exemplary parameter operation for performing an image conversion.

FIG. 12 is a diagram illustrating a second exemplary parameter operation where an illumination conversion is performed, and original parameter values IINLEP and new parameter values IOUTLEP corresponding to one line are written and arranged for each pixel. The above-described seven parameters are determined for each pixel, and the ambient light luminance Ia, the ambient light reflectance ρa, and the illumination vector L 20 are common to each pixel. The diffuse reflection component proportion kd, the diffuse reflection component reflectance ρd, and the specular reflection component reflectance ρs depend on a material of an object, to each of which, therefore, a subscript indicating a material type is attached. Also, for the surface normal vector N of the original parameter value IINLEP, the first subscript indicates a material type, and the second subscript indicates a difference between pixels in the same material.

Figure 13:
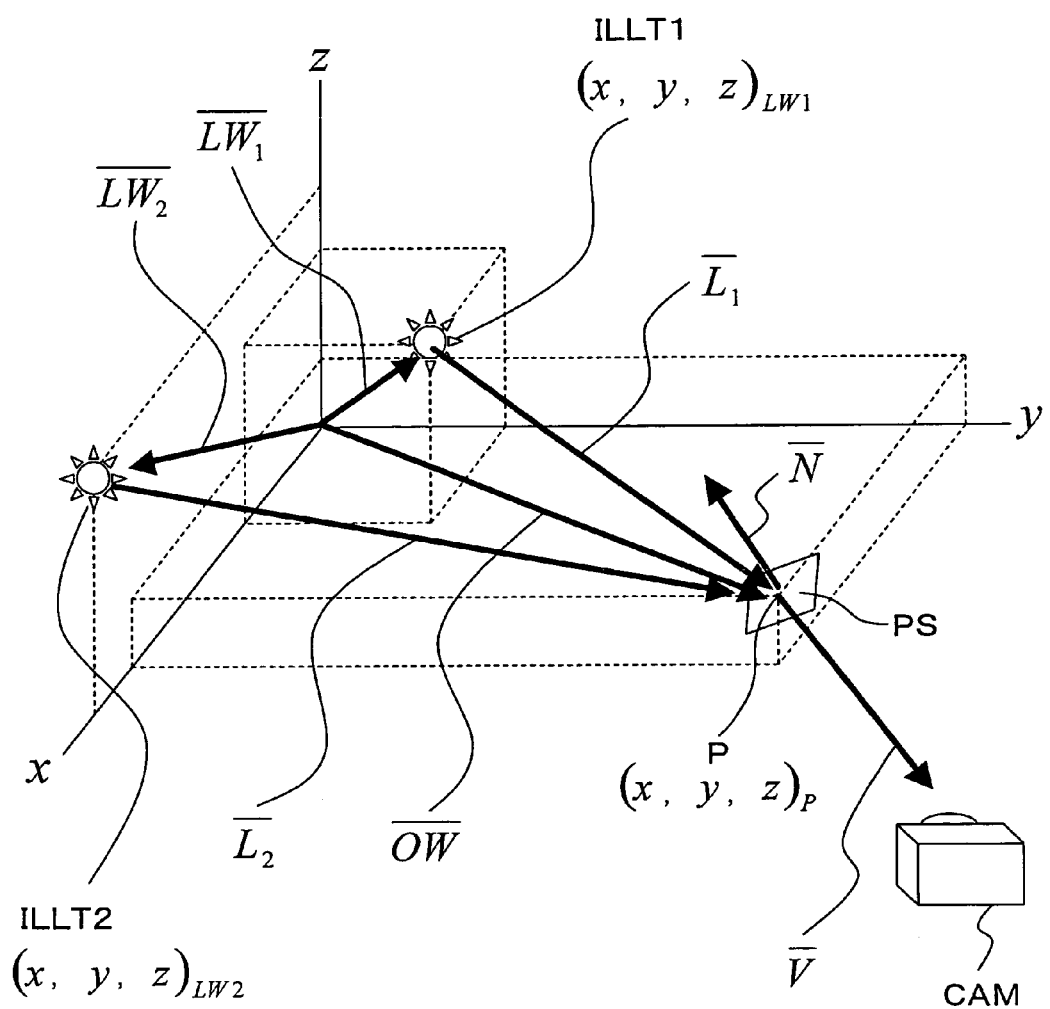
FIG. 13 is a diagram illustrating a relationship between a location of illumination and an illumination vector.

It is now assumed that an image conversion that "convert a location of illumination from $(x, y, z)_{LW1}$ (ILLT1) into (x, y, z)$_{LW2}$ (ILLT2)" is prescribed using the image conversion prescribing signal ICIS from the image conversion prescribing section 105, as illustrated in FIG. 13. As can be seen from expression (1A) in expression (1):

$$I_i(\overline{N} \cdot \overline{L}) d\omega \quad (1A)$$

an illuminance at a point of interest P on a minute surface PS of a subject surface increases with a decrease in an angle between the surface normal vector N and the illumination vector L, and decreases with an increase in the angle between the surface normal vector N and the illumination vector L. Therefore, if the location of illumination is changed, the illuminance at the point of interest P is changed. Also, if a relationship between the illumination vector L and the viewpoint vector V is changed, an intensity of specular reflection is also changed, so that, as described in FIG. 7, if the viewpoint vector approaches the positive reflection location of the illumination vector, the intensity of specular reflection increases, and if the viewpoint vector goes away from the positive reflection location of the illumination vector, the intensity of specular reflection decreases. Thus, if the location of illumination is changed, an amount of light reflected to the viewpoint vector V is changed, so that an image recorded in the camera CAM is changed.

The parameter operation setting section 106 replaces the prescription of the image conversion that "convert a location of illumination from $(x, y, z)_{LW1}$ into $(x, y, z)_{LW2}$" with a parameter operation that "convert an illumination vector L1 into an illumination vector L2", and supplies the parameter operation as the parameter operation prescribing signal LEPS to the parameter operating section 104. Here, the illumination vector L1 is given as a difference between a point-of-interest-P vector OW and an illumination located vector LW1, i.e., $(x_P - x_{LW1}, y_P - y_{LW1}, z_P - z_{LW1})$. Also, the illumination vector L2 is given as a difference between the point-of-interest-P vector OW and an illumination located vector LW2, i.e., $(x_P - x_{LW2}, y_P - y_{LW2}, z_P - z_{LW2})$.

The parameter operating section 104 converts the illumination vector L1 into the illumination vector L2 in accordance with the parameter operation prescribing signal LEPS. Note that, in the case where there is a parallel light assumption that the illumination vector L is the same at all locations on a subject, if an illumination vector is calculated at a point of interest P, the illumination vector can be applied to all pixels. On the other hand, in the case where there is a point-source light assumption that the illumination vector L is radiated and spread from a single point to all directions, since the illumination vector L varies depending on the location of the point of interest P, it is necessary to calculate the illumination vector L after a point-of-interest-P vector OW is changed to another for each pixel.

Figure 14:
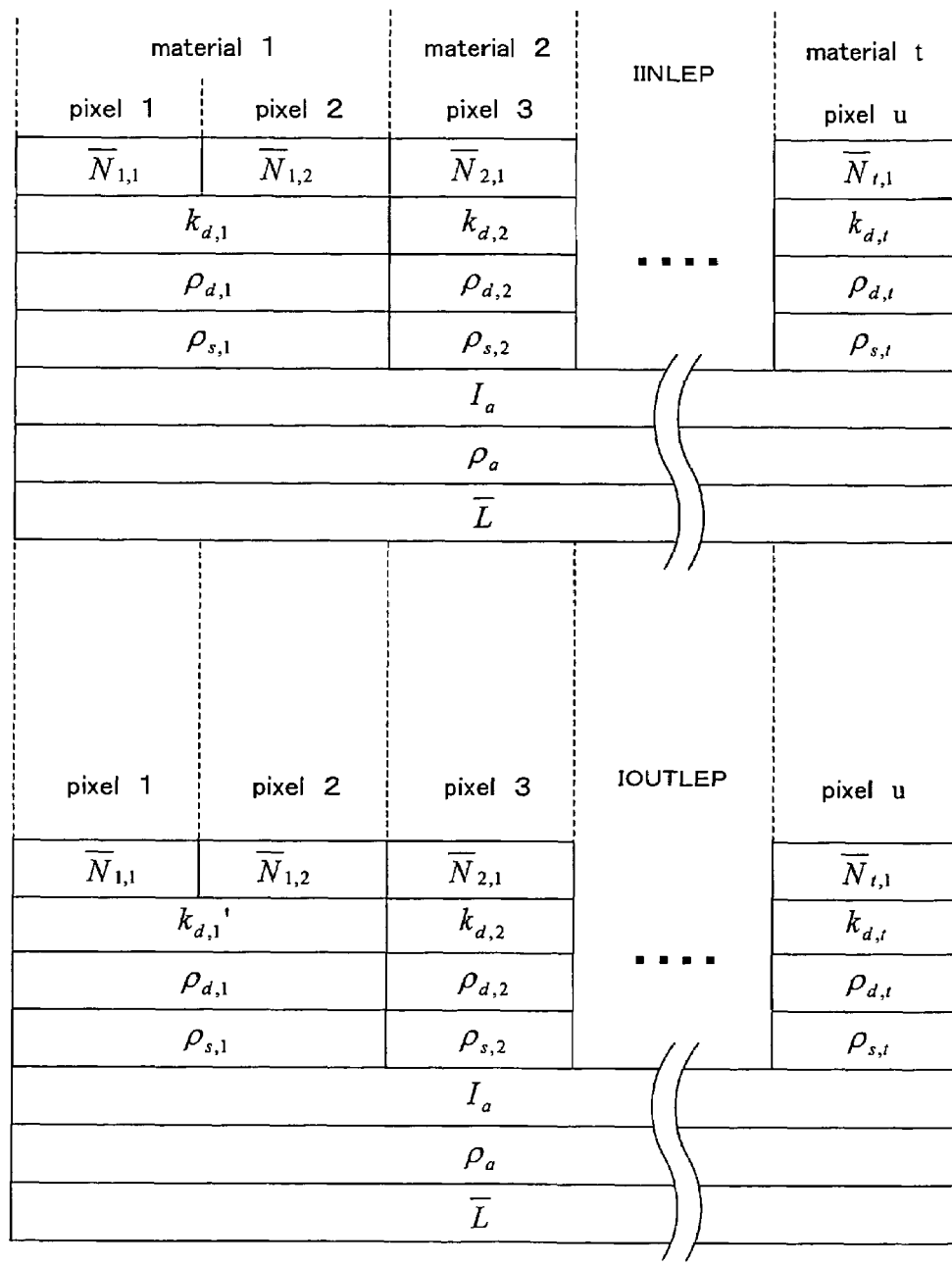
FIG. 14 is a diagram illustrating a third exemplary parameter operation for performing an image conversion where a diffuse reflection component proportion of a specific material is converted.

FIG. 14 is a diagram illustrating a third exemplary parameter operation where the diffuse reflection component proportion kd of a specific material is converted, and original parameter values IINLEP and new parameter values IOUTLEP corresponding to one line are written and arranged for each pixel. The above-described seven parameters are determined for each pixel, and the ambient light luminance Ia, the ambient light reflectance ρa, and the illumination vector L are common to each pixel. The diffuse reflection component proportion kd, the diffuse reflection component reflectance ρd, and the specular reflection component reflectance ρs depend on a material of an object, to each of which, therefore, a subscript indicating a material type is attached. Also, for the surface normal vector N of the original parameter value IINLEP, the first subscript indicates a material type, and the second subscript indicates a difference between pixels in the same material.

Figure 15:
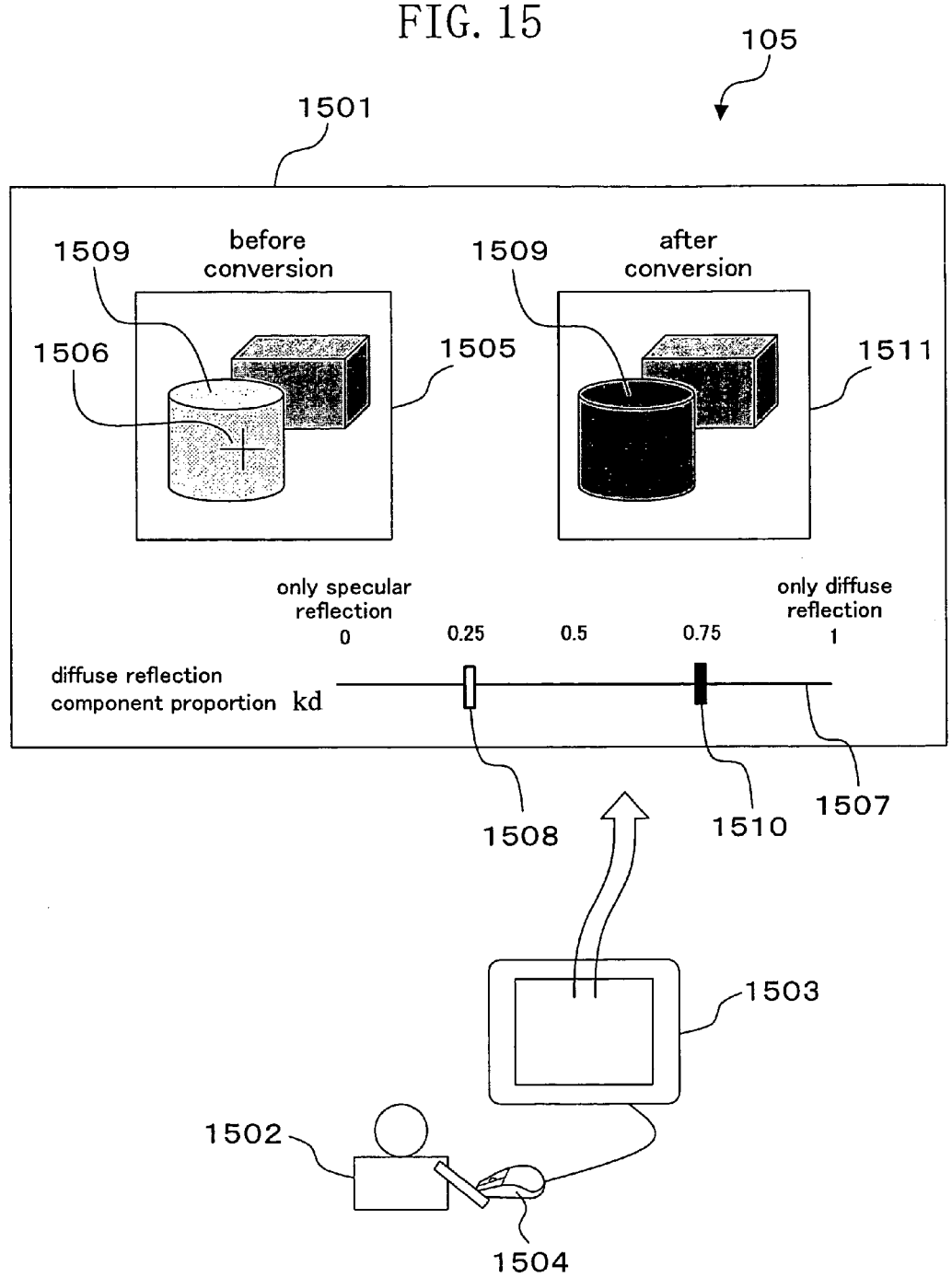
FIG. 15 is a diagram illustrating an interface for adjustment of a diffuse reflection component proportion, possessed by an image conversion prescribing section 105.

FIG. 15 illustrates an interface 1501 for adjustment of the diffuse reflection component proportion kd, possessed by the image conversion prescribing section 105. An operator 1502 inputs a conversion prescription to the image conversion prescribing section 105 using an input device 1504, such as a mouse or the like, while viewing the adjustment interface 1501 displayed on a display 1503. The operator 1502 moves a cursor 1506 to a material whose diffuse reflection component proportion kd is to be changed, in a pre-conversion image 1505, and picks up the diffuse reflection component proportion kd of the material indicated by the cursor 1506 by, for example, clicking the input device 1504. If this is the pixel 1 of IINLEP of FIG. 14, $k_{d,1}$ is picked up. In FIG. 15, it is assumed that $k_{d,1} = 0.25$, and a slider 1508 is displayed on a location of 0.25 on the slide bar 1507. As illustrated in FIG. 14, since the pixel 2 of IINLEP has the same material as that of the pixel 1 of IINLEP, the diffuse reflection component proportion $k_{d,1}$ is also to be converted. In other words, the diffuse reflection component proportions kd of all pixels belonging to an object 1509 made of the same material of FIG. 15 are to be converted.

Following this, the operator 1502 moves the slider 1508 to a location of 0.75 on the slide bar 1507 (illustrated as a slide bar 1510), and changes the diffuse reflection component proportion kd to 0.75. The diffuse reflection component of the object 1509 increases, so that, in this example, the luminance of the object 1509 decreases, resulting in conversion into dark texture as illustrated in a post-conversion image 1511. The result of changing of the diffuse reflection component proportion kd is displayed as the output image IOUT in the post-conversion image 1511 using a method described below, and the operator 1502 evaluates the result of adjustment of the diffuse reflection component proportion kd based on his/her own purpose of image production. When the adjustment is insufficient, the slider 1510 is still moved, and a series of operations are repeated while confirming the post-conversion image 1511. The contents of a conversion of the diffuse reflection component proportion kd which are set in the image conversion prescribing section 105 are assumed to be that "change the diffuse reflection component proportion $k_{d,1}$ of the material 1 to $k_{d,1}$'", and are transferred to the parameter operation setting section 106 using the image conversion prescribing signal ICIS. As indicated with expression (1), kd and ks which represent the portions of the diffuse reflection component and the specular reflection component, respectively, have a relationship: kd+ks=1. Therefore, when $k_{d,1}$ is changed to $k_{d,1}$', $k_{s,1}$' becomes $1-k_{d,1}$'. The parameter operation setting section 106 replaces a prescription of an image conversion that "change the diffuse reflection component proportion $k_{d,1}$ of the material 1 to $k_{d,1}$'" with a parameter operation that "change the diffuse reflection component proportion $k_{d,1}$ of the material 1 to $k_{d,1}$', and the specular reflection component proportion $k_{s,1}$ to $1-k_{d,1}$'", which is in turn supplied as the parameter operation prescribing signal LEPS to the parameter operating section 104.

The parameter operating section 104 sets the diffuse reflection component proportion kd of expression (1) to be $k_{d,1}$', and the specular reflection component proportion ks of expression (1) to be $1-k_{d,1}$', in accordance with the parameter operation prescribing signal LEPS. The image generating section 107 calculates the illumination equation of expression (1) using IOUTLEP of FIG. 14, so that the result is the output image IOUT. Although conversion of the diffuse reflection component proportion kd of a specific material is performed in the example of FIG. 15, the diffuse reflection component proportions kd of all pixels can be multiplied by α (α is an arbitrary positive constant). In this case, it is no longer necessary to designate a material using the cursor 1506, and all the diffuse reflection component proportions kd are multiplied by α. As a result of multiplication by α, when the diffuse reflection component proportion kd exceeds 1, kd is clipped into 1 so that the constraint kd+ks=1 is satisfied.

Figure 16:
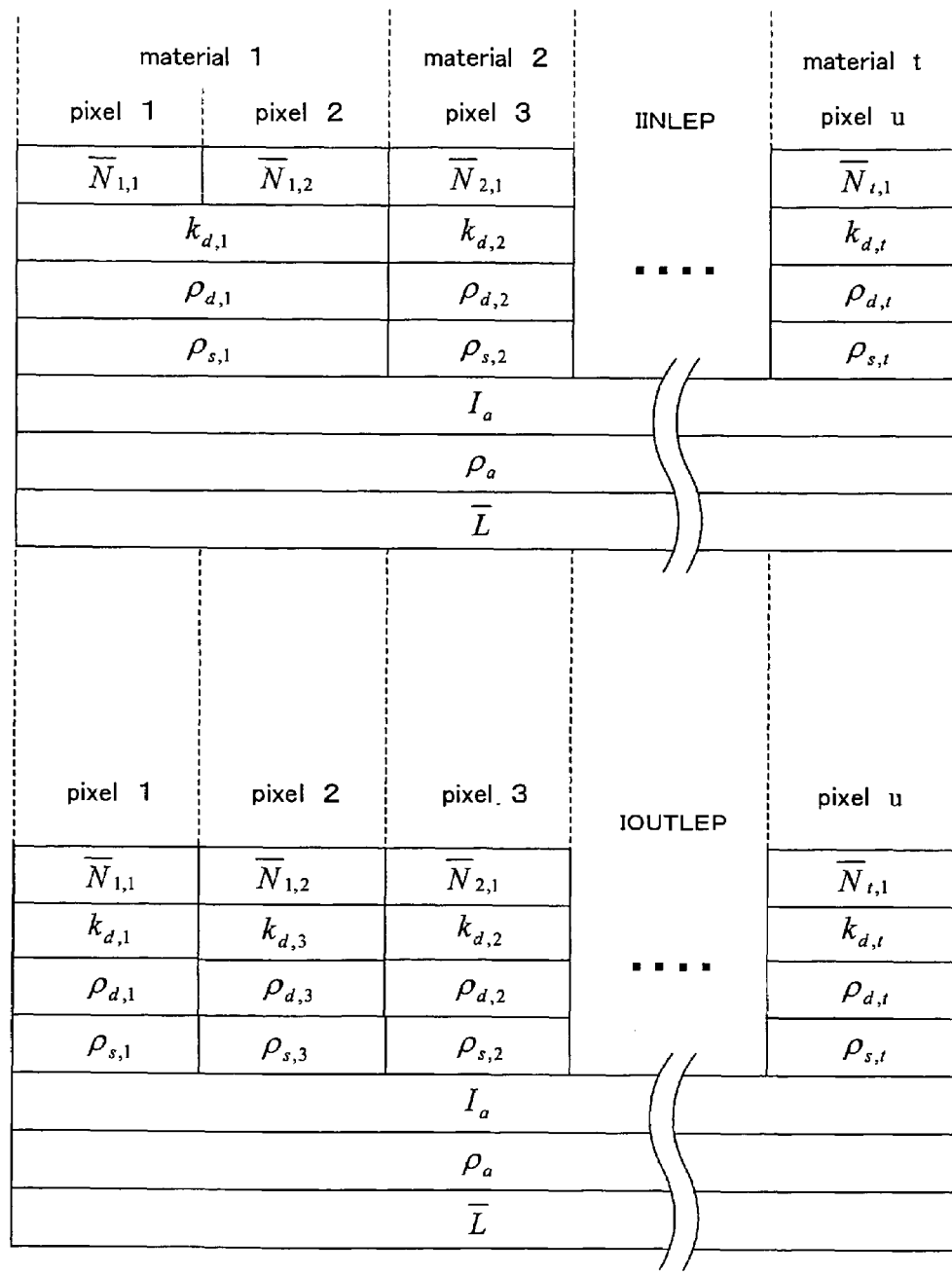
FIG. 16 is a diagram illustrating a fourth exemplary parameter operation for performing an image conversion where a material of a specific pixel is converted.

FIG. 16 is a diagram illustrating a fourth exemplary parameter operation where a specific pixel material is converted, and original parameter values IINLEP and new parameter values IOUTLEP corresponding to one line are written and arranged for each pixel. The above-described seven parameters are determined for each pixel, and the ambient light luminance Ia, the ambient light reflectance ρa, and the illumination vector L 25 are common to each pixel. The diffuse reflection component proportion kd, the diffuse reflection component reflectance ρd, and the specular reflection component reflectance ρs depend on a material of an object, to each of which, therefore, a subscript indicating a material type is attached. Also, for the surface normal vector N of the original parameter value IINLEP, the first subscript indicates a material type, and the second subscript indicates a difference between pixels in the same material.

Figure 17:
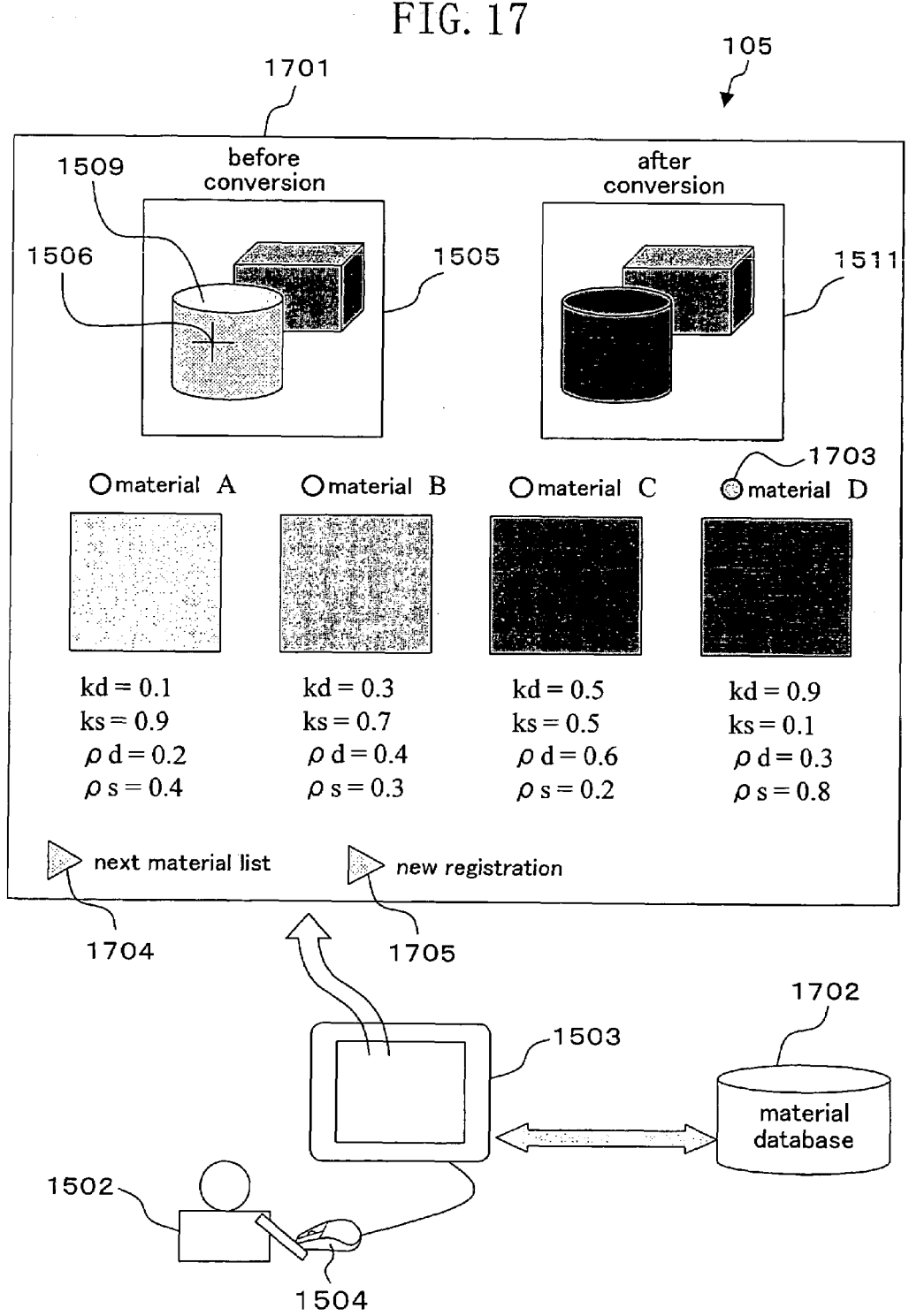
FIG. 17 is a diagram illustrating material change interface possessed by the image conversion prescribing section 105.

FIG. 17 illustrates a material change interface 1701 possessed by the image conversion prescribing section 105. The operator 1502 inputs a conversion prescription to the image conversion prescribing section 105 using the input device 1504 while viewing the material change interface 1701 displayed on the display 1503. In a material database 1702, material images and parameters are stored. In FIG. 17, images of a material A to a material D and parameters which are read out from the material database 1702 are displayed. The operator 1502 moves the cursor 1506 to a pixel whose material is desired to be changed in the pre-conversion image 1505, and confirms the pixel to be converted by, for example, clicking the input device 1504. Since the material-specific parameters are the diffuse reflection component proportion kd, the diffuse reflection component reflectance ρd, and the specular reflection component reflectance ρs, the three parameters are to be converted. Specifically, assuming that the cursor 1506 of FIG. 17 is located in the pixel 2 of IINLEP of FIG. 16, ($k_{d,\,1}$, $\rho_{d,\,1}$, $\rho_{s,\,1}$) of the pixel 2 are to be converted. Next, the operator 1502 designates a target material. In the example of FIG. 17, a radio button 1703 of the material D is checked to determine that ($k_{d,\,3}$, $\rho_{d,\,3}$, $\rho_{s,\,3}$)=(0.9, 0.3, 0.8) in the pixel 2 of IOUTLEP. The material D has a low luminance as compared to the object 1509, resulting in conversion into dark texture. The above-described operations are performed by the image conversion prescribing section 105, and a prescription that "set the diffuse reflection component proportion kd, the diffuse reflection component reflectance ρd, and the specular reflection component reflectance ρs of the pixel 2 of IOUTLEP to be 0.9, 0.3, and 0.8, respectively" is transferred to the parameter operation setting section 106 using the image conversion prescribing signal ICIS. The parameter operation setting section 106 supplies the prescription that "set the diffuse reflection component proportion kd, the diffuse reflection component reflectance ρd, and the specular reflection component reflectance ρs of the pixel 2 of IOUTLEP to be 0.9, 0.3, and 0.8, respectively" to the parameter operating section 104 using the parameter operation prescribing signal LEPS.

The parameter operating section 104 converts the diffuse reflection component proportion $k_{d,\,1}$ of the pixel 2 into a diffuse reflection component proportion $k_{d,\,3}$ (=0.9), the diffuse reflection component reflectance $\rho_{d,\,1}$ of the pixel 2 into a diffuse reflection component reflectance $\rho_{d,\,3}$ (=0.3), and the specular reflection component reflectance $\rho_{s,\,1}$ of the pixel 2 into a specular reflection component reflectance $\rho_{s,\,3}$ (=0.8), in accordance with the parameter operation prescribing signal LEPS. Thereafter, the output image IOUT is obtained by the image generating section 107. Although there is only one pixel to be converted in the above-described example, a plurality of pixels can be collectively designated or an area of an image is designated for conversion into a specific material. Note that, a "next material list" button 1704 is used so as to retrieve another material from the material database 1702, and a "new registration" button 1705 is used so as to register a new material into the material database 1702.

Figure 18:
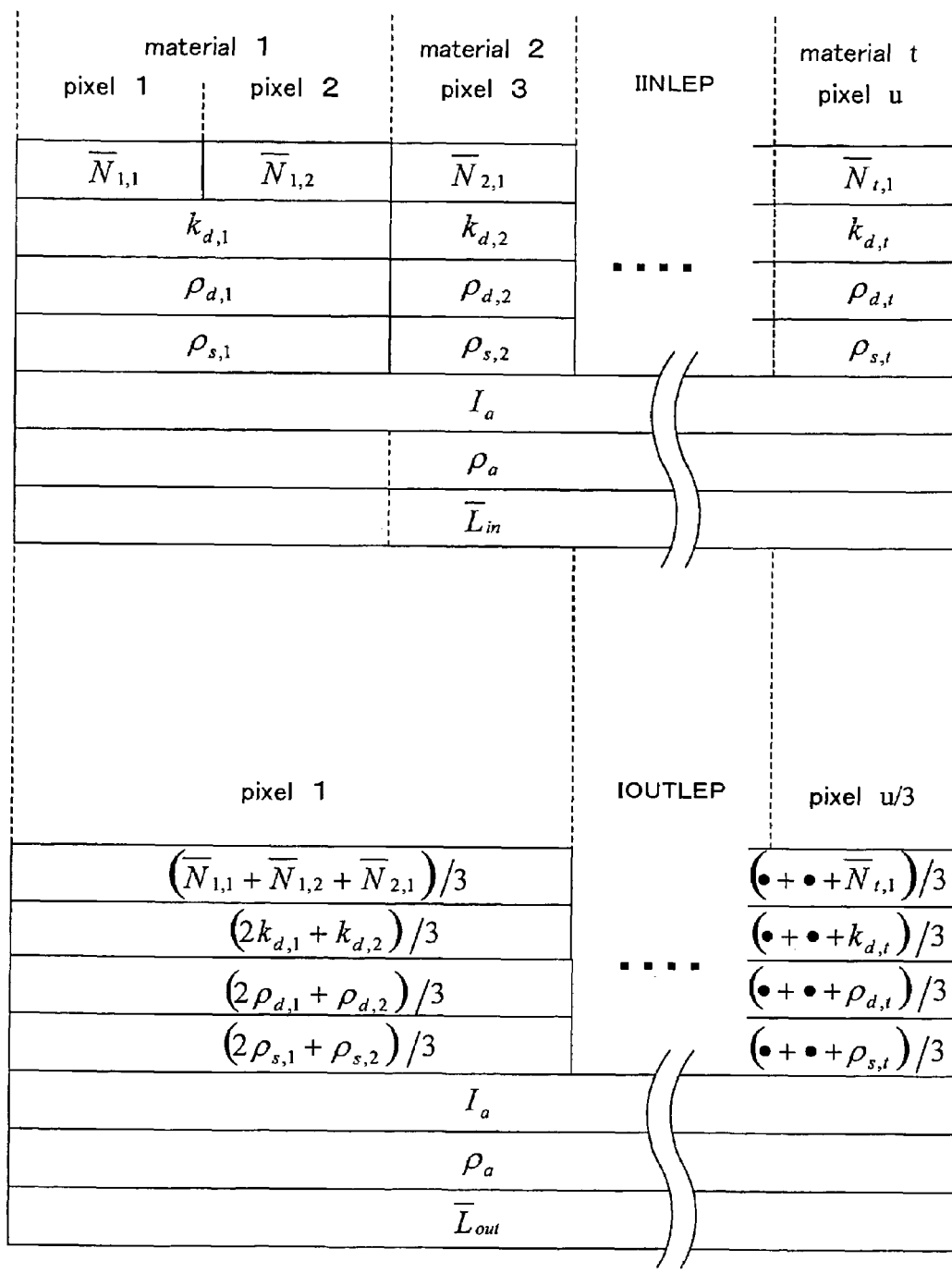
FIG. 18 is a diagram illustrating a fifth exemplary parameter operation for performing an image conversion where image reduction is performed.

FIG. 18 illustrates a fifth exemplary parameter operation where image reduction is performed, and original parameter values IINLEP and new parameter values IOUTLEP corresponding to one line are written and arranged for each pixel. The above-described seven parameters are determined for each pixel, and the ambient light luminance Ia, the ambient light reflectance ρa, and the illumination vector L are common to each pixel. The diffuse reflection component proportion kd, the diffuse reflection component reflectance ρd, and the specular reflection component reflectance ρs depend on a material of an object, to each of which, therefore, a subscript indicating a material type is attached. Also, for the surface normal vector N of the original parameter value IINLEP, the first subscript indicates a material type, and the second subscript indicates a difference between pixels in the same material.

It is now assumed that an image conversion that "reduce an image by a factor of ⅓" is prescribed using the image conversion prescribing signal ICIS. In this case, the parameter operation setting section 106 replaces the prescription of the image conversion that "reduce an image by a factor of ⅓" with a parameter operation that "calculate an average value per three pixels of IINLEP to create one pixel of IOUTLEP", which is in turn supplied as the parameter operation prescribing signal LEPS to the parameter operating section 104.

The parameter operating section 104 obtains an average value per three pixels of IINLEP to create one pixel of IOUTLEP in accordance with the parameter operation prescribing signal LEPS. For example, the surface normal vector of the pixel 1 of IOUTLEP is an average ($N_{1,\,1}$+$N_{1,\,2}$+$N_{2,\,1}$)/3 of the surface normal vectors $N_{1,\,1}$, $N_{1,\,2}$ and $N_{2,\,1}$ of the pixel 1, the pixel 2 and the pixel 3 of IINLEP. Similarly, the diffuse reflection component proportion of the pixel 1 of IOUTLEP is an average ($2k_{d,\,1}$+$k_{d,\,2}$)/3 of the diffuse reflection component proportions $k_{d,\,1}$, $k_{d,\,1}$ and $k_{d,\,2}$ of the pixel 1, the pixel 2 and the pixel 3 of IINLEP. The diffuse reflection component reflectance of the pixel 1 of IOUTLEP is an average ($2\rho_{d,\,1}$+$\rho_{d,\,2}$)/3 of the diffuse reflection component reflectances $\rho_{d,\,1}$, $\rho_{d,\,1}$ and $\rho_{d,\,2}$ of the pixel 1, the pixel 2 and the pixel 3 of IINLEP. The specular reflection component reflectance of the pixel 1 of IOUTLEP is an average ($2\rho_{s,\,1}$+$\rho_{s,\,2}$)/3 of the specular reflection component reflectances $\rho_{s,\,1}$, $\rho_{s,\,1}$ and $\rho_{s,\,2}$ of the pixel 1, the pixel 2 and the pixel 3 of IINLEP.

Note that the present invention is not limited to the above-described image reduction method, and any arbitrary method is applicable. For example, a method can be utilized in which each parameter image of IINLEP is subjected to a low-pass filter so as to perform sub-sampling every three pixels.

The present invention is not limited to the above-described illumination equation parameter operating method. Therefore, any arbitrary parameter of the illumination equation can be operated using any arbitrary method. As described in the exemplary parameter operating methods with reference to FIGS. 5 to 18, any arbitrary parameter can be operated using any arbitrary method. Geometric characteristics, such as a surface normal vector and the like, are illustrated in a one-dimensional form in FIG. 2 for the sake of convenience. In fact, the geometric characteristics are generally three-dimensional information, and the present invention is not limited to one dimension. The interpolation method indicated with expressions (2), (3) and (4) are only for illustrative purposes, and any arbitrary method can be applied to the increasing of spatial density. Although image enlargement has been described as the increasing of the density of the surface normal vectors N in FIG. 5, this is only for illustrative purposes. The present invention does not limit an illumination equation parameter to be operated and a method for operating the same. For example, in the present invention, the density of the diffuse reflection component proportion kd can be increased, the densities of both the surface normal vector N and the diffuse reflection component proportion kd can be increased, and the like, i.e., spatial density can be increased with respect to any arbitrary parameter or a combination of any arbitrary parameters. Also, any arbitrary illumination parameter is subjected to image conversion, and a combination of any arbitrary illumination parameters is subjected to image conversion. Although a line of an image is illustrated in FIGS. 5 to 18, if this is applied in a length direction and a width direction, two-dimensional image processing can be achieved.

Thereafter, in step S5, the image generating section 107 generates the output image IOUT (second image) based on the new parameter value IOUTLEP obtained in step S4.

Figure 19:
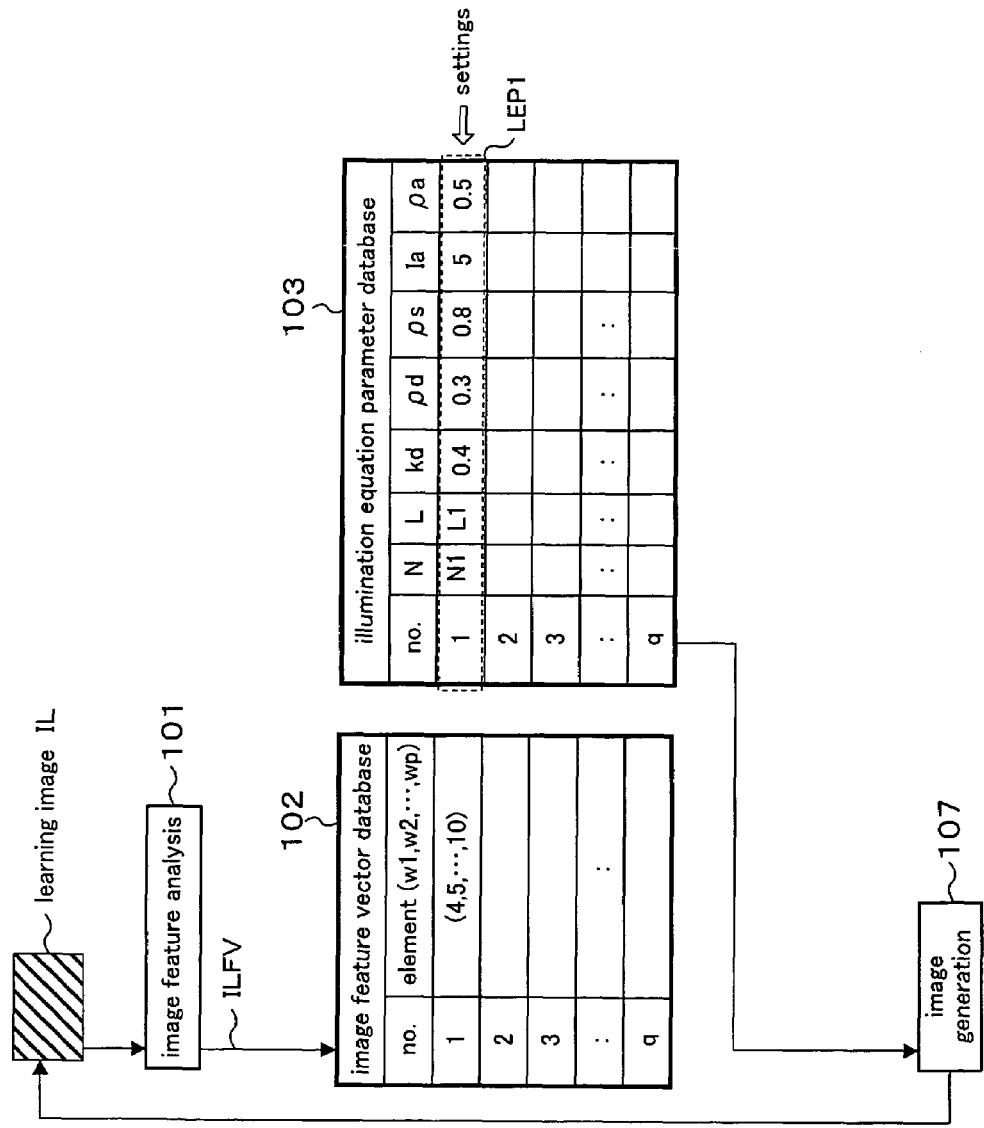
FIG. 19 is a diagram illustrating a method for learning a relationship between image features and illumination equation parameters.

Here, the preprocess S00 will be described in detail with reference to FIG. 19. Here, images created from the illumination equation are used for learning of image feature vectors, thereby associating the image feature vectors with illumination equation parameters.

Specifically, initially, a first parameter value LEP1 (number 1) is set as an illumination equation parameter value. Thereafter, the first parameter value LEP1 is used to execute calculation of expression (1), thereby generating a learning image IL. The learning image IL thus generated is subjected to an image feature analysis which is substantially equivalent to the above-described step S1, thereby obtaining an image feature vector ILFV. The image feature vector ILFV is stored into number 1 of the image feature vector database 102. Thereby, the image feature vector ILFV and the first parameter value LEP1 are saved into the databases 102 and 103, respectively, while being associated with each other. By repeatedly performing such a process, the image feature vector database 102 and the illumination equation parameter database 103 as illustrated in FIG. 1 are generated. Although the image generating section 107 generates an image and the image feature analyzing section 101 performs an image feature analysis in FIG. 19, the image generation and the image feature analysis may be performed using other means in the preprocess S00.

According to the above-described embodiment, the illumination equation parameter IINLEP suitable for the input image IIN is selected from the image feature vector IINFV in the input image IIN. Thereafter, by operating the parameter IINLEP, various output images IOUT can be generated. Therefore, it is possible to achieve an image conversion which is not limited by image data during learning, and has a high degree of freedom.

Also, since an image conversion is performed by operating the illumination equation parameter IINLEP, it is not necessary to prepare a uselessly large number of learning images, i.e., it is possible to suppress the number of learning images. Also, since the learning image IL can be generated by a computer using the illumination equation in the preprocess, it is not necessary to capture an image of a real object so as to generate a learning image. Therefore, the process can be made simple and various learning images can be easily prepared. Note that, as the image feature ILFV of the learning image IL approaches the image feature IINFV of the input image IIN, a more appropriate illumination equation parameter can be obtained. Therefore, when the learning image IL is generated, it is desirable to set illumination equation parameters, assuming conditions under which the input image IIN is captured. For example, if a place where the input image IIN is captured can be limited, and as a result, the location of illumination can be limited, data when the input image IIN is captured is utilized as the illumination vector L.

Although image enlargement has been described as an exemplary image conversion in this embodiment, the present invention is not limited to this. A parameter operation can be similarly performed in other image conversions. For example, when an illumination direction is desired to be changed, the illumination vector L may be changed. Also, when a ratio of a diffuse reflection component to a specular reflection component is desired to be changed, the diffuse reflection component proportion kd may be changed.

Also, since the specular reflection component reflectance ρs is defined by a bidirectional reflectance, the specular reflection component reflectance ρs varies depending on the viewpoint direction. Therefore, for example, if a Cook-Torrance model given by expression (5) is introduced, a viewpoint vector V, a roughness coefficient m, and Fresnel coefficient Fλ can be added as illumination equation parameters. Thereby, it is possible to perform image conversions, such as changing of a viewpoint direction, changing of a surface roughness, and the like.

$$\rho_s = \frac{F_\lambda}{\pi} \frac{DG}{(\overline{N} \cdot \overline{V})(\overline{N} \cdot \overline{L})} \quad (5)$$

$$D = \frac{1}{4m^2\cos^4\beta} e^{-[(\tan\beta)/m]^2}$$

$$G = \min\left\{1, \frac{2(\overline{N} \cdot \overline{H})(\overline{N} \cdot \overline{V})}{(\overline{V} \cdot \overline{H})}, \frac{2(\overline{N} \cdot \overline{H})(\overline{N} \cdot \overline{L})}{(\overline{V} \cdot \overline{H})}\right\}$$

$$F_\lambda = \frac{1}{2}\frac{(g-c)^2}{(g+c)^2}\left(1 + \frac{[c(g+c)-1]^2}{[c(g-c)+1]^2}\right)$$

$$g^2 = n^2 + c^2 - 1$$

$$c = (\overline{L} \cdot \overline{H})$$

Figure 20:
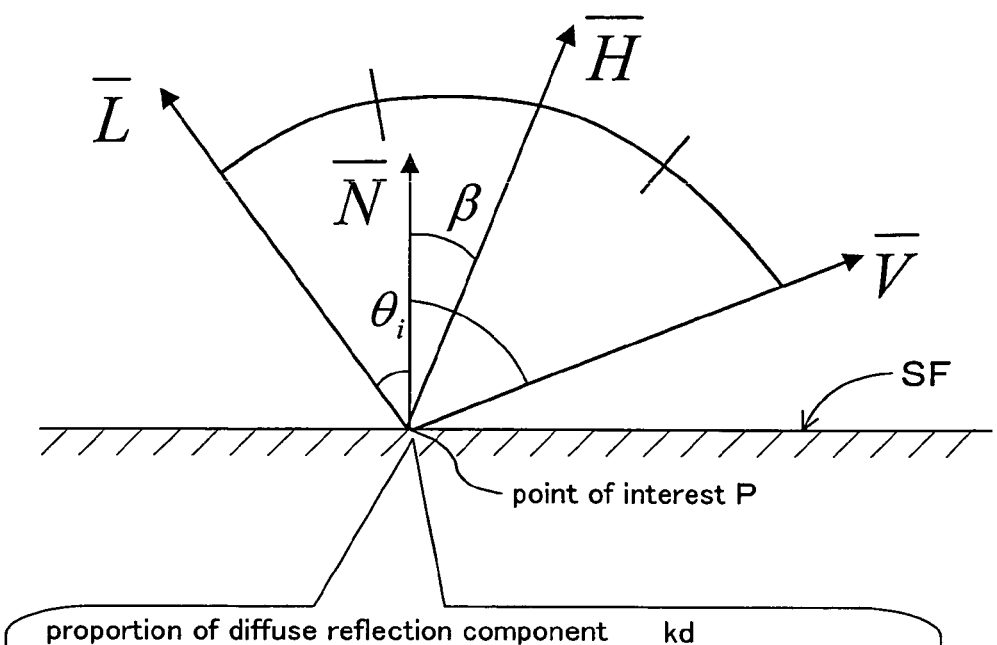
FIG. 20 is a diagram for explaining geometric conditions and optical conditions for an illumination equation.

In expression (5), as illustrated in FIG. 20, H represents an intermediate vector between the viewpoint vector V and the illumination vector L, β represents an angle between the intermediate vector H and the surface normal vector N. m represents a coefficient of roughness of an object surface. When m is small, there is strong reflection in a portion where the angle β is small, i.e., in the vicinity of the surface normal vector N. When m is large, a reflection distribution is spread into a portion where the angle β is large, i.e., a portion away from the surface normal vector N. G represents a geometric attenuation factor, which indicates an influence of light shield due to unevenness of an object surface. n represents an index of refraction.

Thus, in the present invention, the illumination equation can be arbitrarily defined, and is not limited to expression (1) or (5).

Figure 21:
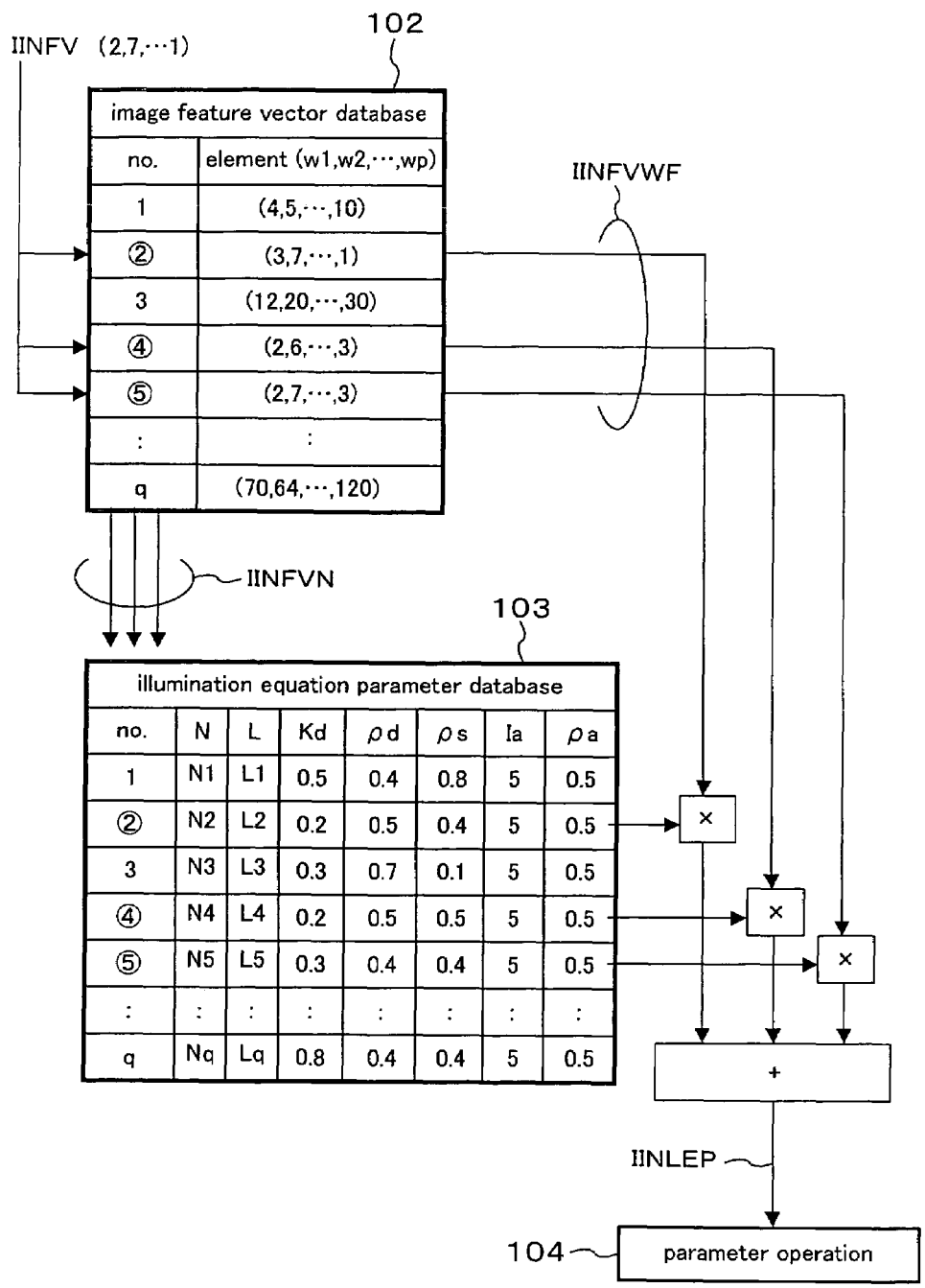
FIG. 21 is a diagram illustrating another method for obtaining a parameter corresponding to an image feature.

Also, although an illumination equation parameter corresponding to an image feature vector closest to an image feature vector IINFV is obtained as an original parameter value IINLEP in this embodiment, a method of obtaining an original parameter value IINLEP is not limited to this. For example, an original parameter value IINLEP may be obtained as illustrated in FIG. 21. Specifically, initially, a predetermined number (three in FIG. 21) of image feature vectors similar to an input image feature vector IINFV are selected. Thereafter, a distance between each selected image feature vector and the input image feature vector IINFV is obtained, and a weighting coefficient IINFVWF depending on the distance is determined. Thereafter, parameter values corresponding to the respective three selected image feature vectors are weight-added using the weighting coefficients IINFVWF, and the result is output as an original parameter value IINLEP. Note that, instead of weighted addition, an average may be simply calculated for parameter values respectively corresponding to a predetermined number of selected image feature vectors.

Note that it is not necessary to previously learn the relationship between image features and illumination equation parameters, and the relationship may be prepared by any arbitrary means.

Hereinafter, exemplary configurations for implementing the present invention will be described.

(First Exemplary Configuration)

Figure 22:
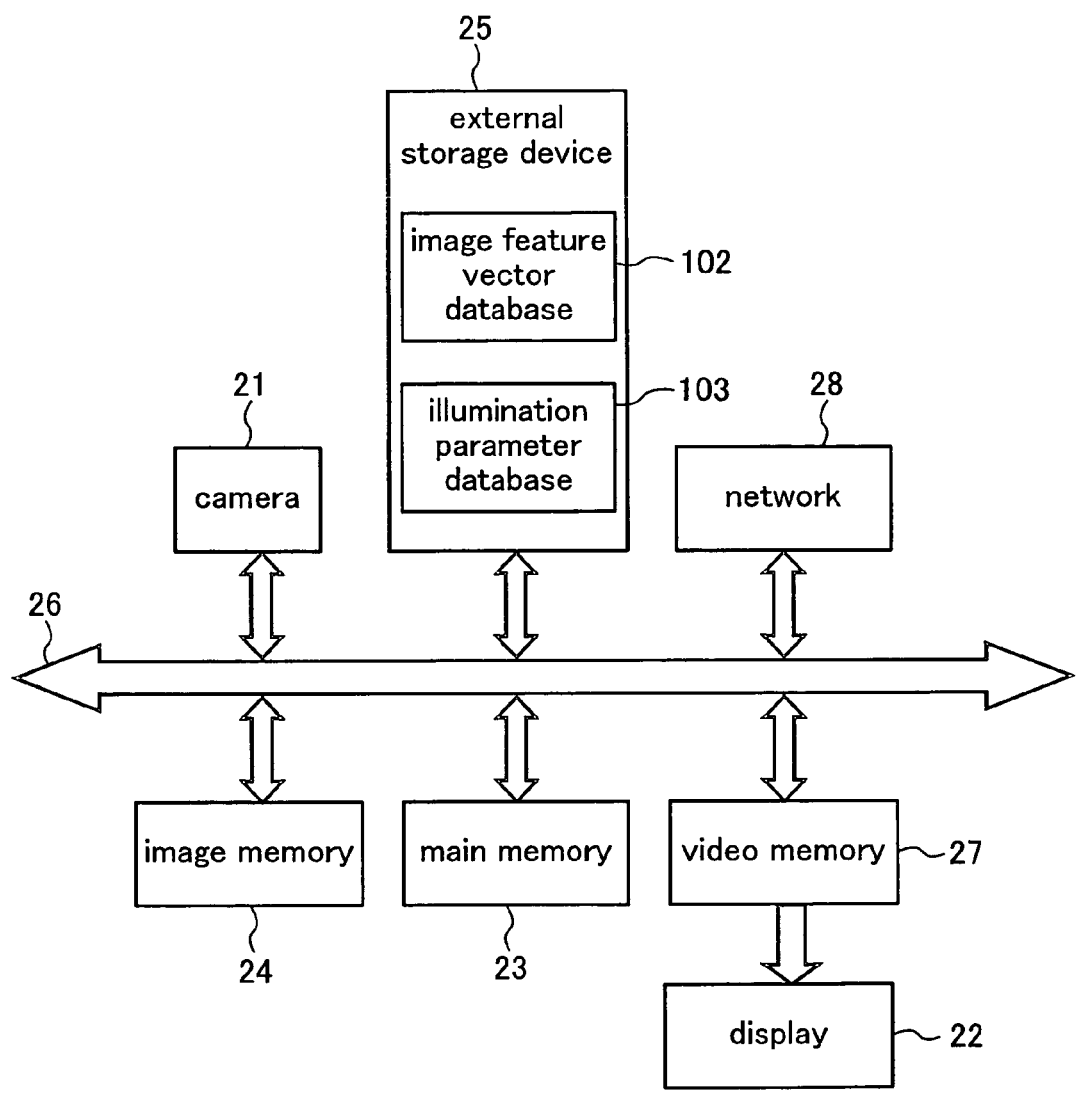
FIG. 22 is a diagram illustrating a first exemplary configuration which implements the present invention, where a personal computer is used.

FIG. 22 is a diagram illustrating a first exemplary configuration where a personal computer is used to perform an image conversion according to the present invention. A camera 21 has a resolution lower than that of a display 22, and creates an enlarged image using an image conversion program loaded in a main memory 23 so as to make the most of the display ability of an display 22. A low-resolution image captured by the camera 21 is recorded into an image memory 24. The image feature vector database 102 and the illumination equation parameter database 103 are previously prepared in an external storage device 25, and can be referenced from the image conversion program in the main memory 23. The operation of the image conversion program, and the contents, creation method and the like of the image feature vector database 102 and the illumination equation parameter database 103 are the same as those described in the first embodiment. The image conversion program in the main memory 23 reads the low-resolution image from the image memory 24 via a memory bus 26, and converts the low-resolution image into a high-resolution image which fits a resolution of the display 22, and transfers the high-resolution image to a video memory 27 via the memory bus 26 again. The high-resolution image transferred to the video memory 27 can be viewed on the display 22.

Note that the present invention is not limited to the configuration of FIG. 22, and can have various configurations. For example, the image feature vector database 102 and the illumination equation parameter database 103 may be obtained from an external recording apparatus connected to another personal computer, via a network 28. Also, the low-resolution image may be obtained via the network 28.

(Second Exemplary Configuration)

Figure 23:
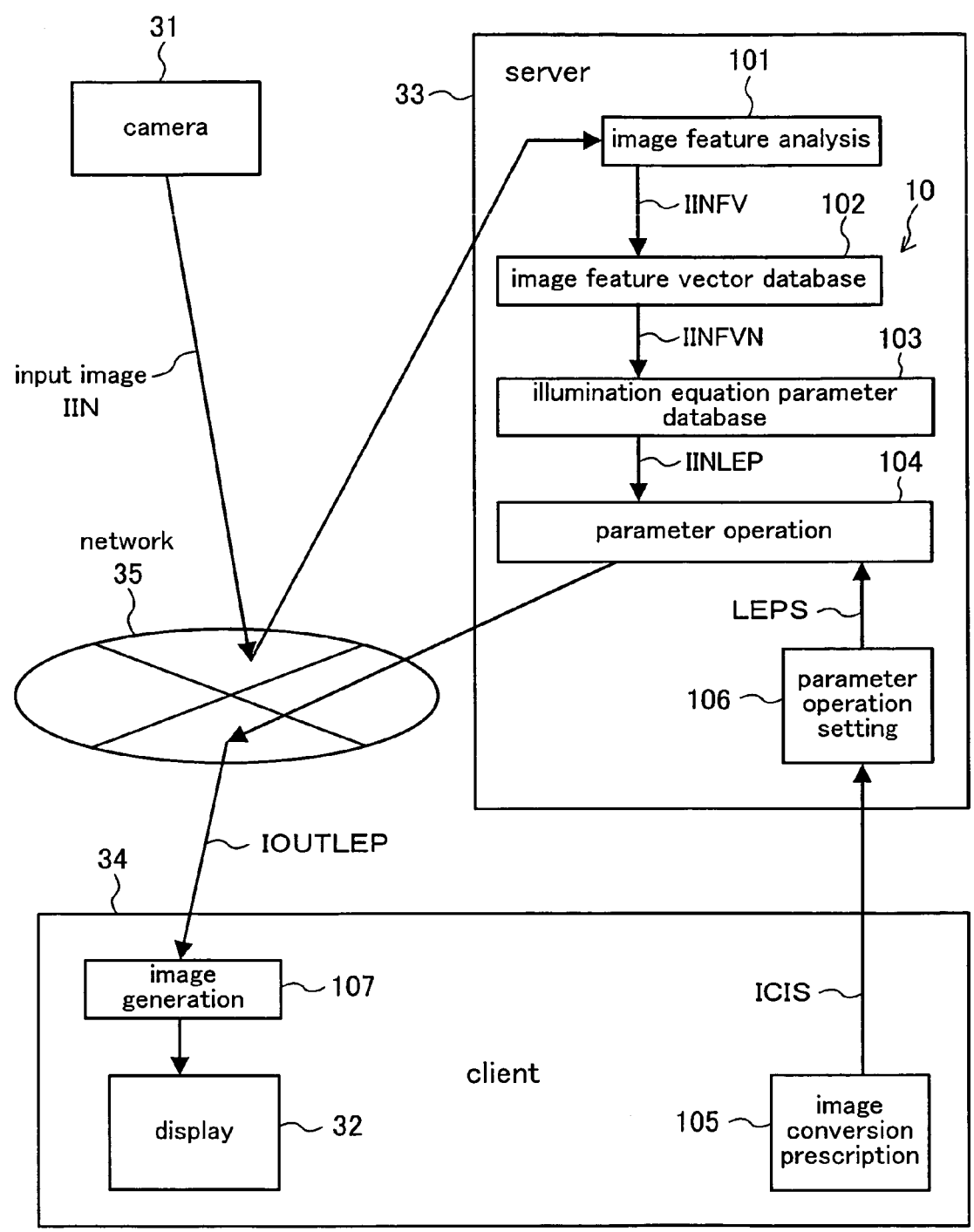
FIG. 23 is a diagram illustrating a second exemplary configuration which implements the present invention, where a server-client system is used.

FIG. 23 is a diagram illustrating a second exemplary configuration where a server-client system is used to perform an image conversion according to the present invention. A camera 31 has a resolution lower than that of a display 32, and performs an image conversion in the server-client system so as to make the most of the display ability of the display 32. In a server 33, as in the first embodiment, the image feature analyzing section 101, the image feature vector database 102, and the illumination equation parameter database 103 calculate the original parameter values IINLEP from the input image IIN. The image feature vector database 102 and the illumination equation parameter database 103 constitute the parameter output section 10. On the other hand, a prescription of an image conversion (image enlargement in this example) is transferred as the image conversion prescribing signal ICIS from the image conversion prescribing section 105 of the client 34 to the parameter operation setting section 106 of the server 33. The parameter operation setting section 106 replaces the contents of the image conversion of the image conversion prescribing signal ICIS with the contents of an operation of illumination equation parameters, which are in turn output as the parameter operation prescribing signal LEPS to the parameter operating section 104. The parameter operating section 104 operates the original parameter values IINLEP to generate the new parameter values IOUTLEP.

With such an operation, the server 33 can provide the new parameter values IOUTLEP which are obtained in accordance with a prescription of an image conversion from the client 34, via a network 35 to the client 34. When the client 34 receives the new parameter values IOUTLEP, the image generating section 107 generates and supplies an enlarged image to the display 32.

Note that the present invention is not limited to the configuration of FIG. 23, and a combination of image apparatuses, and the location in the system of each means (e.g., whether the means belongs to the server 33 or the client 34, or others, etc.) are arbitrarily determined.

(Third Exemplary Configuration)

Figure 24:
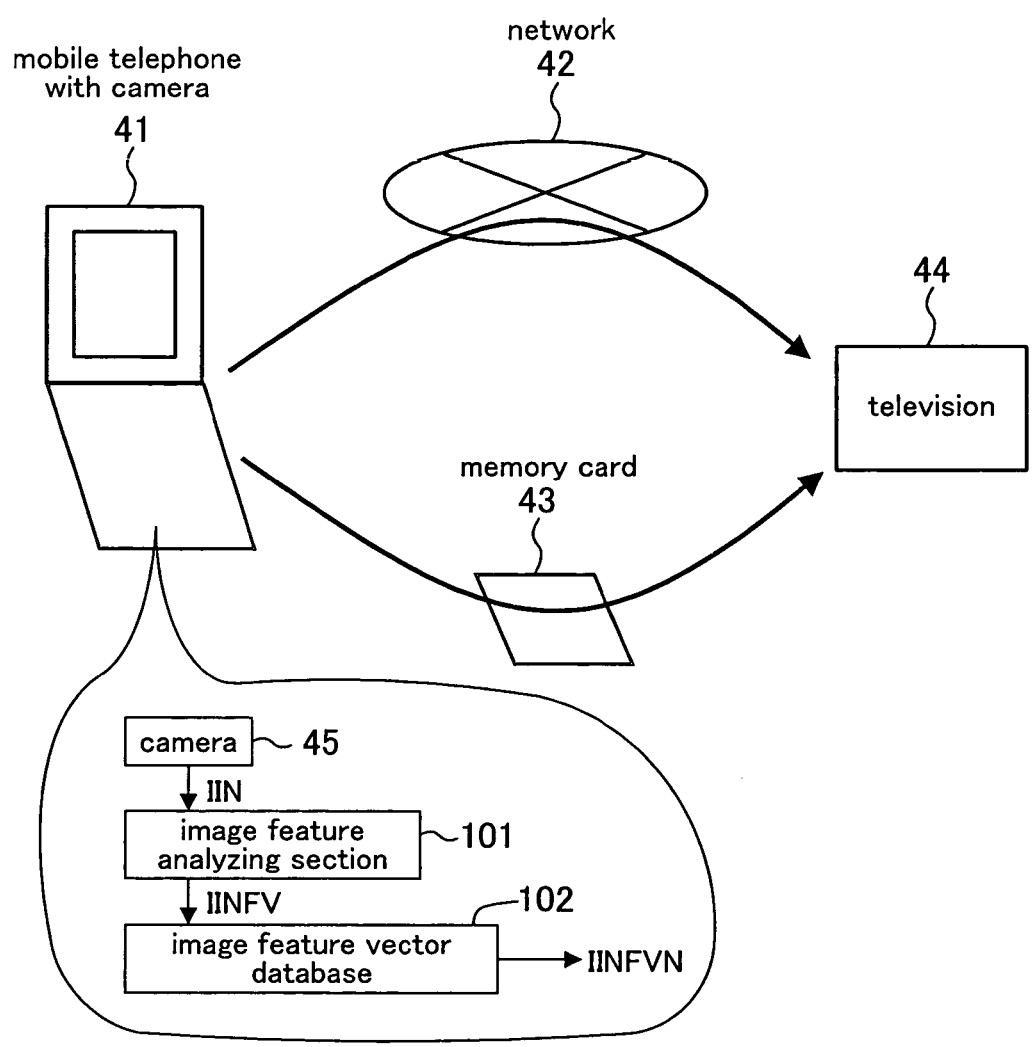
FIG. 24 is a diagram illustrating a third exemplary configuration which implements the present invention, where a mobile telephone with camera and a television are used.

FIG. 24 is a diagram illustrating a third exemplary configuration where a mobile telephone with camera and a television are used to perform image processing according to the present invention. A mobile telephone with camera 41 (mobile apparatus) can transfer image data via a network 42 or a memory card 43 to a television 44. A camera 45 of the mobile telephone with camera 41 has a resolution lower than that of the television 44, and performs image enlargement using the image converting apparatus of the present invention implemented in an internal circuit of the television 44 so as to make the most of the display ability of the television 44.

In view of service charge, the smaller the data amount transferred from the mobile telephone with camera 41 to the television 44, the more the advantageous to the user. Therefore, data to be transmitted on the network 42 is preferably input image feature vector numbers IINFVN. Also, in order to suppress damage due to tapping on the network 42 to a minimum level, it is preferable to transmit the input image feature vector numbers IINFVN which themselves do not have a particular meaning. Specifically, the mobile telephone with camera 41 has the image feature vector database 102 and the television 44 has the illumination equation parameter database 103, so that a desired image conversion can be achieved only after both the mobile telephone with camera 41 and the television 44 are available. Thereby, the service charge can be suppressed to a low level and damage due to tapping can be suppressed to a minimum level. In FIG. 24, the mobile telephone with camera 41 comprises the camera 45, the image feature analyzing section 101 for performing an image feature analysis with respect to the image IIN captured by the camera 45 to output a first image feature vector IINFV, and the image feature vector database 102 for specifying an image feature vector similar to the first the image feature vector IINFV from a plurality of stored image feature vectors, and outputting the number IINFVN thereof.

Note that the present invention is not limited to the configuration of FIG. 24, and can have various configurations. For example, the mobile telephone with camera 41 may be a digital still camera or a camcorder.

As described above, the present invention is executable in widespread personal computers and server-client systems, and general video apparatuses, such as mobile telephones with camera, digital still cameras, camcorders, televisions and the like, and a particular apparatus, operation, management, or the like is not required. Note that the present invention does not limit an apparatus connection form and an apparatus internal structure, such as implementation into dedicated hardware, a combination of software and hardware, and the like.

In the present invention, various image conversions, such as enlargement/reduction, illumination conversion, viewpoint conversion, changing of diffuse/specular reflection component proportions, and the like, can be freely performed. Therefore, the present invention can be utilized in the video entertainment field in which a scene in front of the user is recorded as video in sports, sightseeing, taking a memorial picture, and the like. Also, in the culture and art field, the present invention can be utilized so as to provide a digital archive system which is not limited by a subject or a place where an image is captured, i.e., which has a high degree of freedom.

What is claimed is:

1. A method for converting a first image into a second image, comprising:
   a first step of performing an image feature analysis with respect to the first image;
   a second step of obtaining a value of an illumination equation parameter corresponding to the image feature from an image feature of the first image obtained in the first step, as an original parameter value by referencing a relationship between image features and illumination equation parameters which are associated with each other by a preprocess;
   a third step of determining contents of an operation of an illumination equation parameter, depending on a prescribed image conversion;
   a fourth step of operating the original parameter value in accordance with the operation contents determined in the third step, to obtain a new parameter value; and
   a fifth step of generating the second image based on the new parameter value,
   wherein the preprocess comprises the steps of:
      setting a first parameter value as a value of an illumination equation parameter;
      automatically generating a learning image from the first parameter value; and
      performing an image feature analysis substantially equivalent to the first step, with respect to the learning image, and
   the obtained image feature is saved in association with the original parameter value into a database.

2. The method of claim 1, wherein the image feature analysis in the first step is performed using a spatial frequency analysis.

3. The method of claim 1, wherein the first parameter value is set, assuming an illumination equation parameter when the first image is captured.

4. The method of claim 1, wherein the illumination equation represents a luminance in a viewpoint direction by an addition of a diffuse reflection component, a specular reflection component, and an ambient light component.

5. The method of claim 1, wherein the illumination equation parameter includes at least one of a surface normal vector, an illumination vector, a ratio of a diffuse reflection component to a specular reflection component, a reflectance of a diffuse reflection component, and a reflectance of a specular reflection component.

6. The method of claim 1, wherein the third step, when the prescribed image conversion is image enlargement, determines, as the contents of an operation of an illumination equation parameter, to increase a density of at least one of a surface normal vector, an illumination vector, a ratio of a diffuse reflection component to a specular reflection component, a reflectance of a diffuse reflection component, and a reflectance of a specular reflection component.

7. The method of claim 1, wherein the relationship between image features and illumination equation parameters is represented by a plurality of image feature vectors and a plurality of parameter values associated with the respective image feature vectors, and
   the second step comprises the steps of:
      selecting a predetermined number of image feature vectors similar to a first image feature vector representing the image feature of the first image, from the plurality of image feature vectors;
      obtaining a distance between the first image feature vector and each of the predetermined number of image feature vectors; and
      performing a weighted addition of parameter values corresponding to the predetermined number of image feature vectors, respectively, depending on the distances obtained with respect to the respective image feature vectors, to calculate the original parameter value.

8. An image converting apparatus comprising:
   an image feature analyzing section for performing an image feature analysis with respect to an input image to output a first image feature vector representing an image feature of the input image;
   a parameter output section for referencing an image feature vector database storing a plurality of image feature vectors and an illumination equation parameter database storing a plurality of parameters, the databases being associated with each other by a preprocess, and when receiving the first image feature vector, outputting an original parameter value corresponding to the first image feature vector;
   a parameter operation setting section for determining contents of an operation of an illumination equation parameter, depending on a prescribed image conversion;
   a parameter operating section for operating the original parameter value output from the parameter output section in accordance with the operation contents determined by the parameter operation setting section, to obtain a new parameter value; and an image generating section for generating an output image based on the new parameter value output from the parameter operating section, wherein the image converting apparatus performs, as the preprocess:

setting a first parameter value as a value of an illumination equation parameter;

automatically generating a learning image from the first parameter value;

performing an image feature analysis substantially equivalent to the image feature analyzing section, with respect to the learning image; and saving the obtained image feature in association with the original parameter value into the image feature vector database and the illumination equation parameter database, respectively.

* * * * *